US008358623B2

(12) United States Patent
Samar et al.

(10) Patent No.: US 8,358,623 B2
(45) Date of Patent: Jan. 22, 2013

(54) ACTIVE HANDOFFS IN A NETWORK

(75) Inventors: Prince Samar, Waltham, MA (US); Woojune Kim, Waltham, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 1140 days.

(21) Appl. No.: 11/935,975

(22) Filed: Nov. 6, 2007

(65) Prior Publication Data

US 2009/0116445 A1    May 7, 2009

(51) Int. Cl.
H04W 4/00      (2009.01)
H04W 36/00    (2009.01)
H04L 12/28     (2006.01)
H04L 12/56     (2006.01)

(52) U.S. Cl. ........................................ 370/331; 370/394
(58) Field of Classification Search .................. None
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,042,869 B1 * | 5/2006 | Bender | 370/349 |
| 7,170,871 B2 | 1/2007 | Eyuboglu et al. | |
| 7,197,026 B2 * | 3/2007 | Chen et al. | 370/342 |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,603,127 B2 | 10/2009 | Chung et al. | |
| 8,059,581 B2 * | 11/2011 | Gillies et al. | 370/328 |
| 2002/0196749 A1 | 12/2002 | Eyuboglu et al. | |
| 2003/0100311 A1 | 5/2003 | Chung et al. | |
| 2004/0042507 A1 * | 3/2004 | Pelletier et al. | 370/521 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0271014 A1 * | 12/2005 | Gillies et al. | 370/331 |
| 2005/0286471 A1 * | 12/2005 | Yang et al. | 370/331 |
| 2006/0067273 A1 * | 3/2006 | Suman et al. | 370/331 |
| 2006/0067422 A1 | 3/2006 | Chung | |

(Continued)

FOREIGN PATENT DOCUMENTS

GB    2452688    3/2009

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

(Continued)

*Primary Examiner* — Chirag Shah
*Assistant Examiner* — Ashley Shivers
(74) *Attorney, Agent, or Firm* — Fish & Richardson P.C.

(57) ABSTRACT

Techniques for transferring a communication connection for a client device from a source network device to a target network device include receiving first and second sequence numbers and applying a first processing technique to data segments associated with sequence numbers that succeed the first and the second sequence numbers.

45 Claims, 14 Drawing Sheets

U.S. PATENT DOCUMENTS

| | | |
|---|---|---|
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153722 A1* | 7/2007 | Gillies et al. ............... 370/328 |
| 2007/0155329 A1 | 7/2007 | Mehrabanzad et al. |
| 2007/0165604 A1* | 7/2007 | Mooney et al. ............ 370/352 |
| 2007/0177547 A1* | 8/2007 | Horn et al. ................. 370/331 |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2007/0293254 A1* | 12/2007 | Jiang ........................... 455/466 |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |

OTHER PUBLICATIONS

Paul Bender & Ramin Rezalifar, "Draft Baseline Text for the 1xEV-DO Upper Layers (excluding Physical Layer)", 3GPP2, Aug. 17, 2000.

3GPP2, "3GPP2 Access Network Interfaces Interoperability Specification 2, Release A," Jun. 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024-A, version 1, Mar. 2004 (1083 pages).

3rd Generation Partnership Project 2 "3GPP2", "Inter-Operability Specification (IOS) for High Rate Packet Data (HRPD) Access Network Interfaces", A.S0007-0, version 2, Nov. 2001 (118 pages).

Network Working Group, "IP Mobility Support for IPv4", RFC 3344, Aug. 2002 (93 pages).

Network Working Group, "The Point-to-Point Protocol (PPP)", RFC 1661, Jul. 1994 (50 pages).

Network Working Group, "IP Version 6 over PPP", RFC 2472, Dec. 1998 (14 pages).

Network Working Group, "Internet Protocol, Version 6 (IPv6) Specification", RFC 2460, Dec. 1998 (37 pages).

Network Working Group, "Neighbor Discovery for IP Version 6 (IPv6)", RFC 2461, Dec. 1998 (87 pages).

Network Working Group, "IPv6 Stateless Address Autoconfiguration", RFC 2462, Dec. 1998 (24 pages).

Johnson, D. et al., "Mobility Support for IPv6", Internet Draft draft-ietf-mobileip-ipv6-22.txt., RFC 3775, Mar. 2003 [MIPv6] (155 pages).

ElMalki, K., et al., "Low latency Handoffs in Mobile IPv4", draft-ietf-mobileip-lowlatencyhandoffs-v4-04.txt, Jun. 2003 [FMIPv4] (updated version of Jun. 2002) (67 pages).

Koodli, R., et al., "Fast Handovers for Mobile IPv6", draft-ietf-mobileip-fast-mipv6-0.5.txt., Sep. 2003 [FMIPv6] (33 pages).

Gustafsson, Eva, et al., "Mobile IPv4 Regional Registration", draft-ietf-mobile-reg-tunel-07.txt, Nov. 2003 {HMIPv4](updated version of Oct. 2002 )(40 pages).

Soliman, H., et al., "Hierarchial MIPv6 mobility management (HMIPv6)", draft-ietf-mobileiphmipv6-07.txt, Jun. 2003 [HMIPv6] (updated version of Oct. 2002)(29 pages).

Williams, C., "Localized Mobility Management Requirements for IPv6", draft-ietf-mobileip-lmmrequirements-01.txt., Mar. 2003 [LMMRQ] (11 pages).

* cited by examiner

ACTIVE HANDOFFS IN A NETWORK

TECHNICAL FIELD

This description relates to active handoffs in a network.

BACKGROUND

Cellular wireless communications systems, for example, are designed to serve many access terminals distributed over a large geographic area by dividing the area into regions called "cells". At or near the center of each cell, a network-side access device (e.g., an access point) is located to serve client-side access devices located in the cell and commonly referred to as "access terminals" or "mobile stations."

Examples of access terminals include cellular telephones, laptops, and PDAs. An access point generally establishes a call, also referred to as a "connection," with an access point to communicate with other entities (e.g., servers in the internet or other users in the network).

A handoff refers to the process of transferring an ongoing call from one network-side access device to another. An ongoing call may be referred to as a "connection" or a "session," both of which can be used interchangeably. A handoff may occur when an access terminal moves from the area covered by a first access point (with which it has established a call) to an area covered by a second access point. In this case, the handoff transfers the call from the first access point to the second access point to avoid call termination when the access point moves outside of the range of the first access point. A handoff may also occur when the capacity for connecting new calls of a particular access point is reached. In this scenario, the access point may transfer an existing call (or a new call) to another access point located within an overlapping cell.

SUMMARY

In general, in one aspect, the invention features methods and computer programs for transferring a communication connection for a client device from a source network device to a target network device. The method includes receiving, at a target network device, first and second sequence numbers, the first sequence number corresponding to a data segment sent from the source network device to the client device, and the second sequence number corresponding to a data segment received by the source network device from the client device; associating the first sequence number with a data segment sent from the target network device to the client device; associating the second sequence number with a data segment received by the target network device from the client device; and applying a first processing technique to data segments associated with sequence numbers that succeed the first and the second sequence numbers.

In general, in another aspect, the invention features a system that includes memory storing first and second sequence numbers received from a source network device where the first sequence number correspond to a data segment sent from the source network device to a client device, and the second sequence number corresponds to a data segment received by the source network device from the client device. The system also includes one or more processors configured to associate the first sequence number with a data segment sent from the source network device to the client device; associate the second sequence number with a data segment received from the client device; and apply a first processing technique to data segments associated with sequence numbers that succeed the first and the second sequence numbers.

In general, in a further aspect, the invention features a method and computer program for transferring a communication connection for a client device from a source network device to a target network device. The method includes storing copies of complete data packets that are transferred between the source network device and the client device before a handoff is triggered, the copies including a first set of data packets and a second set of data packets, the first set of data packets originating from the source network device and the second set of data packets originating from the client device; transferring the copies of the first set of data packets from the source network device to the target network device after the handoff is triggered. receiving first and second sequence numbers, the first sequence number corresponding to the first set of data packets, the second sequence number corresponding to the second set of data packets; and processing the first and the second set of data packets initially.

In general, in yet a further aspect, the invention features a system that includes memory storing data segments received from a source network device over a first tunnel, the received data segments being associated with sequence numbers that precede the first sequence number and that need to be sent to a client device; and one or more processors configured to send data segments to the source network device over a second tunnel, the sent data segments being associated with sequence number that precede the second sequence number and are received from the client device.

Implementations may include one or more of the following. The first processing technique may be performed at a first network layer and a second processing technique, performed at a second, higher network layer, may be applied to the data segments. No data loss may occur during transfer of the communication connection from the source network device to the target network device. A first number of data segments received from the source network device may be buffered; a second number data segments received from the client device may be buffered; the first and second numbers of data segments being may be sufficient to reconstruct packets of data transmitted during transfer of the communication connection from the source network device to the target network device; and control of the communication connection may be transferred from the source network device to the target network device. At the source network device, a copy of the complete data packets may be stored, and in response to detecting a timeout, the copy may be removed from memory. At least a portion of the data within the copy of the complete data packets may bes stored in an uncompressed form Advantages may include one or more of the following. During a handoff, a call may be transferred from one access point to another access point while the call is in progress or the call may be transferred from a radio network controller to and another radio network controller. A variety radio link protocol (RLP) transfer methods and compression (including decompression) methods (e.g., robust header compression (ROHC) are provided. Some of the RLP transfer methods and compression schemes described herein may be implemented with little delay and overhead, but are more susceptible to data loss. Other RLP methods and compression techniques described herein, by contrast, eliminate or nearly eliminate data loss, but in turn require more overhead and incur more delay than those techniques that are more susceptible to data loss. A combination of an RLP transfer method and a compression scheme may be selected based on the application being implemented to take advantage of the tradeoffs between various RLP transfer methods and compression techniques. For example, some applications may be intolerant of data loss yet relatively tolerant of handoff delay while in other applications, it may be preferable to perform handoffs rapidly even at the expense of some data loss. The RLP methods and compression techniques reduce the amount of historical data needed to be transferred during a handoff while maintaining the compression ratio established before the handoff.

The details of one or more embodiments are set forth in the accompanying drawings and the description below. Other features, objects, and advantages will be apparent from the description and drawings, and from the claims.

DETAILED DESCRIPTION

Figure 1:
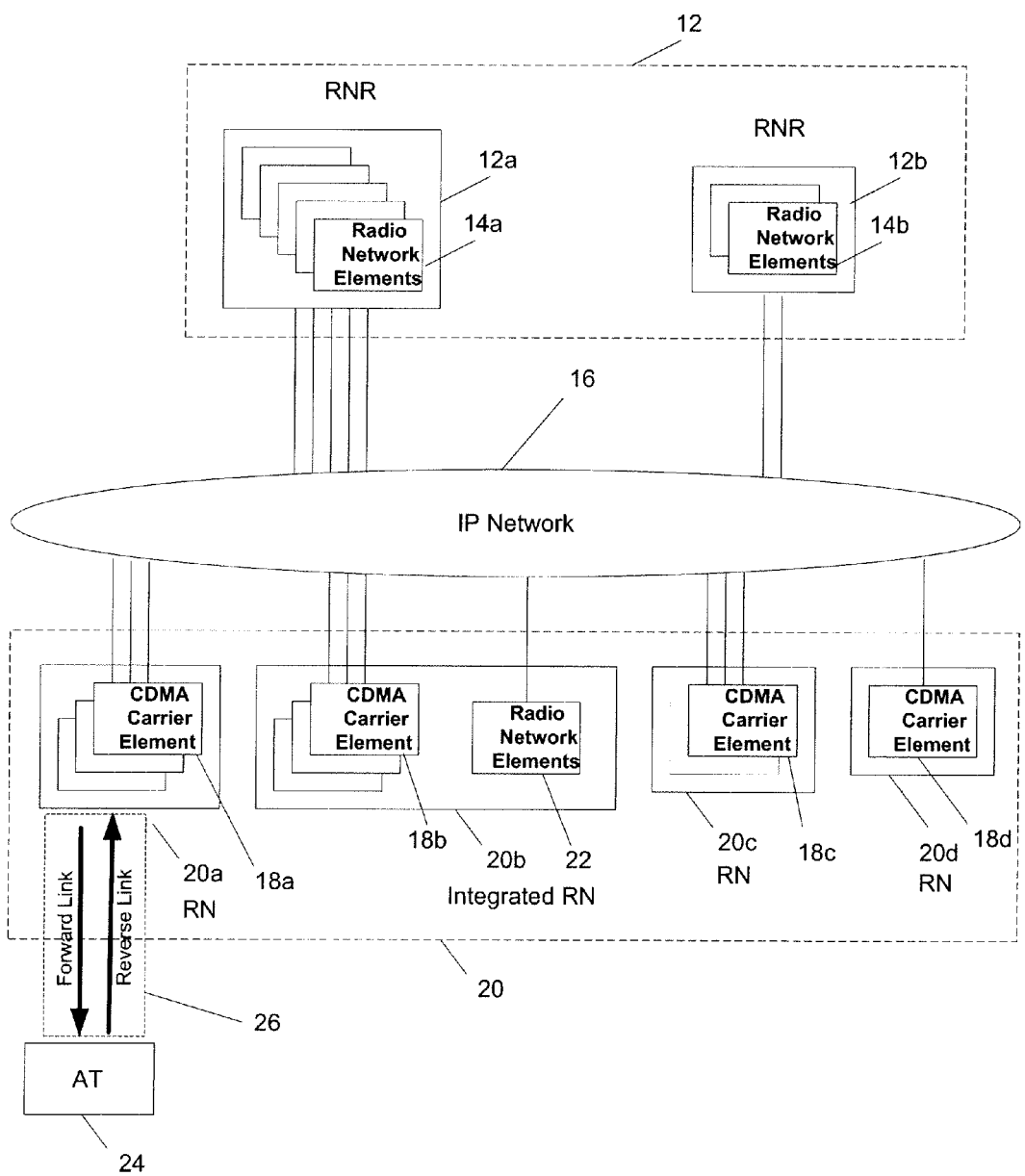
FIG. 1 is a block diagram of a radio access network (RAN).

An Internet protocol (IP) layer and radio link protocol (RLP) layer, or equivalent, of communication stack of a wireless network provide functional and procedural means for implementing a call between a network-side access device (e.g., an access point) and a client-side access device (e.g., an access terminal). At the IP layer (also referred to as a "network layer"), information (e.g., voice, data) transmitted during the call is organized into IP packets, each of which includes a header. The header of a packet usually precedes the actual data that is transmitted and includes destination addresses, error-checking fields, and other information for transmitting and handling the data. The header also typically includes a packet number that uniquely identifies the packet and indicates the order of the packet in a sequence of packets. For the duration of a particular call, some information contained in the headers of packets being sent from the network-side access device to the access terminal (or vice versa) may vary from packet to packet and some header information may remain constant. Header information that remains the same for different packets sent between a source and a destination is referred to as "static context" while header information that varies for different packets is referred to as "dynamic context." Static context, for example, includes the destination address of packets sent from the network-side access device to the access terminal or vice versa so long as the destination address remains the same for the duration of the call. Dynamic context, for example, includes the packet numbers assigned to IP packets transmitted during a call.

Often associated with the IP layer is a header compression scheme to compress or decompress the header of a packet. As the bandwidth of communication channels is limited, it is often desirable to reduce the size of the header using one or more compression schemes before transmitting the packet over a communication channel. An example of a header compression scheme is robust header compression (ROHC). Compression schemes at the IP layer may compress or decompress IP packet headers based on the static context only or based on both the static context and the dynamic context. For the compression scheme to operate based on dynamic context, each of the network-side access device and the access terminal may require a minimum amount of historical or state information regarding the dynamic context of the transmitted and/or received IP packets. For example, if the most-significant digits of the packet numbers being transmitted are already known to both the client-side and network-side devices, the compression scheme may prune some of the most-significant digits from the packet numbers so that the packet numbers are represented by the remaining least-significant digits. In a further example, a network-side access device truncates a packet number of "1,000,101" to "101" (i.e., the last three significant digits of the packet number) before the packet is sent to an access terminal (or vice versa). Using historical information that indicates the most significant digits of the packet numbers received, the decompressor at the receiving device restores the truncated packet number to the full packet number.

Header compression/decompression using ROHC may be implemented by having the transmitting device and the receiving device retain state information about the headers of previously transmitted packets. During a handoff, the state information may need to be transferred from the "source" (i.e., the device that is servicing the call before the handoff) to the "target" (i.e., the device that services the call after the handoff). ROHC uses redundant info of the packets so that it does not have to be sent in each packet. When using dynamic context of packets, ROHC realizes the historical relationship between packets, and sends only the parts that change. In addition to header compression, the IP layer may also perform other state-dependent or "stateful" processes on packets that are transmitted and received.

After processing the information at the IP layer, a network-access device and a client access device processes the information at the RLP layer or its equivalent. The RLP layer (or its equivalent), which is located beneath the IP layer, is included in a number of digital communication standards, including the wireless standards promulgated by the 3GPP, the 3GPP2 and the IEEE. At the RLP layer, the transmitting device breaks up an IP packet into segments and assigns a sequence number to each of the segments. Note that the IP packet itself may have a compressed header resulting from the earlier processing at the IP layer. The transmitting device then transmits the segments over an error prone or lossy link (e.g., a wireless link) to a receiving device. By analyzing the sequence numbers of the segments received, the receiving device determines which, if any, segments are missing. During the course of the transmission, the receiving device may send acknowledgement messages to the transmitting device to indicate that certain segments have been received successfully. The receiving device may send a negative acknowledgement to indicate that a segment has not been received and/or to request the source to resend the segment. After receiving the segments, the receiving device reorders the segments in consecutive order to assemble the IP packet, which may a compressed header. The reordering of the segments is performed at the RLP layer. The receiving device then operates at the IP layer to decompress the header of the IP packet as needed. As described above, the decompression may be based on static context only or based on both the static context and the dynamic context.

The header compression ratio achieved by a network-access device or a client-access device (e.g., an access terminal) depends on the amount of historical information accumulated and maintained by both the client-access device and the network-access device. Thus, to maintain the header compression ratio of a call during handoff, the source network-access device may potentially have to transfer large amounts of accumulated historical information to the target network-access device.

In some conventional handoff schemes, the source must transfer most or all of the historical information that has been accumulated to the target before the target can assume control of the call. In particular, the dynamic context maintained by the compressor of the source network-access may need to be transferred in order for the compressor of the target network-access device to maintain the compression ratio. Transferring large amounts of historical information can introduce noticeable communication delays to a user at an access terminal. Furthermore, such delays may be unacceptable for particular applications (e.g., voice over IP). Other handoff schemes avoid transferring historical information altogether; however, these schemes achieve little to no header compression and therefore require more bandwidth. Here we describe a variety of handoff methods that selectively transfer historical information to reduce handoff latency and still achieve high header compression ratios.

Referring to FIG. 1, a radio access network (RAN) 10 include radio nodes 20a-20c (collectively referred to as radio nodes 20), an IP network 16, and radio network routers (RNRs) 12a-12b (collectively referred to as RNRs 12). The radio network router as a separate network element is optional as the RAN 10 can adopt a flat or distributed architecture where the roles of the radio node and radio network router are combined into a single access point. The radio nodes 20, which are also referred to as "access points," are each configured to communicate with access terminals (ATs), one of which is shown as AT 24, over an airlink 26 (e.g., AT 24 is shown communicating with radio node 20a). The terms "radio node" and "access point" may be used interchangeably, and may represent a distributed architecture or a hierarchical architecture. The airlink 26 includes a forward link channel over which data is sent from the radio node 20a to the AT 24 and a reverse link channel over which data is sent from the AT 24 to the radio node 20a. The RAN 10 is configured to support various mobile wireless access technologies, an example of which is 1xEV-DO (1XEV-DO).

High Data Rate (1XEV-DO) is an emerging mobile wireless access technology that enables personal broadband Internet services to be accessed anywhere, anytime (see P. Bender, et al., "CDMA/1XEV-DO: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, 1XEV-DO is an air interface optimized for Internet Protocol (IP) packet data services that can deliver a shared forward link transmission rate of up to 2.46 Mbit/s per sector using only (1X) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TLA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), 1XEV-DO networks can be built entirely on IP technologies, all the way from the mobile Access Terminal (AT) to the global Internet, thus taking advantage of the scalability, redundancy and low-cost of IP networks.

Examples of communication protocols used by the RAN 10 include, the evolution data-only (1x EV-DO) protocol and other CDMA 2000 protocols. The 1x EV-DO protocol is an evolution of the current 1xRTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, and is also incorporated herein by reference.

The system 10 and methods described below are not restricted to the EV-DO standard and may use other communications standards. Furthermore, the ATs may be used with any version of the EV-DO protocol, including the 1x EV-DO protocol, and the term "access terminal" is interchangeable with the term "mobile station."

The radio nodes 20a-d of the RAN 10 include CDMA carrier elements (CCE's) 18a-18d (collectively referred to as CCE's 18), respectively and the RNRs 12a-b include radio network elements (RNEs) 14a-14b (collectively referred to as RNE's 14), respectively. The CCE's 18 and RNE's 14 communicate with each other over the IP network 16. The IP network 16 may include multiple networks and supports various methods of IP transport service by which CCEs and RNEs communication, including but not limited to frame relay, metro Ethernet, ATM, 802.16, and other wireless backhaul communication protocols. The CCEs 18 support forward and reverse link channels established between an AT and their respective radio node. The CCEs of a particular radio node also perform physical layer functions as well as media access control (MAC) layer functions of the airlink. Alternately, the CCE and the RNE may be part of a single access point and can communicate directly without the need for an external IP network. In this case, the different access points communicate to one another and to the core network using the IP network.

The RNE's perform traditional radio access and link maintenance functions of both a radio network controller (RNC) and a packet data serving node (PDSN), among other functions. These traditional functions include controlling the transmitters and receivers of the radio nodes 20, initiating and maintaining client sessions and connections with ATs, routing data packets received from an external network (not shown) to which the RNE's are coupled, initiating handoffs, and sector selection. The RNEs 14 also transmit and receive data packets (e.g., voice over IP packets) to and from external devices (e.g., servers) connected to the external network.

The RNE's 14 can be viewed as application-layer routing engines for communication networks (e.g., CDMA networks), which serve all CCE's 18 in the IP RAN 10. By contrast to existing 3GPP2 CDMA architecture, in the IP RAN 10 there is no fixed association between the CCE's 18 and the RNE's 14. For example, a CCE (e.g, CCE 18a) may be simultaneously serving any number of RNE's 14 in the RAN 10.

In some implementations, the RAN 10 includes one or more sub-networks or "subnets", e.g., 1xEV-DO subnets to which individual CCEs are assigned. For example, CCEs 18a may be assigned to a first 1xEV-DO subnet and CCEs 18b-18c may be assigned to a second, different 1xEV-DO subnet. In these implementations, a single RNE may serve CCEs that belong to a single 1xEV-DO subnet.

Radio nodes 20 are physical nodes that are often, but not always, located at or within a cell site. In some embodiments, a radio node (e.g., radio node 20a) is split into two separate physical nodes, one being a digital unit that includes the CCEs and one being an RF unit supporting RF communications. The RF unit and the digital unit may be connected via a fiber-optic cable, and the digital unit may be located at a central site away from the cell site. A radio node typically includes CCEs and may additionally include RNEs. For example, radio node 20*b* is shown to include both CCEs 18*b* and RNEs 22. Radio node 20 *b* is an integrated radio node that can serve as an IP wireless access point.

RNRs 12 are physical nodes that are sometimes located at a central office or data center. RNEs (e.g., RNEs 14) may be located within an RNR. Multiple RNE's may be present in the same RNR, and multiple RNR's may be placed in the same location, thereby allowing the operator to grow RNE capacity at a single site in a scalable fashion. As described above, an RNE may also be located inside an RN.

Although all CCE's and RNE's of RAN 10 can communicate with each other over the IP network 16, those CCE's and/or RNE's that are physically located in close proximity to one another, e.g., in the same node or same site, may communicate with each other using a form of Ethernet. For example, CCE 18*b* and RNEs 22 of integrated radio node 20 may communicate using an Ethernet protocol.

The RAN 10 is architecturally flexible and can be organized as a variety of architectures including a centralized, semi-distributed, a distributed architecture, and combinations thereof. In a centralized architecture, one or more RNR's 12, each with one or more RNE's 14, are clustered in one central site and this one RNR cluster serves all radio nodes 20 in the RAN 10. In a semi-distributed (also termed "semi-centralized") architecture, the RNR's 12 are deployed in multiple geographic sites, possibly in central offices very close to the radio nodes 20, but not co-located with radio nodes 20. Finally, in a fully distributed architecture, the RNEs 14 of the RNRs 12 are within close proximity to the CCE's 18, either in the same site or in an integrated radio node (such as the radio node 20*b*). The handoff methods described below can reduce handoff latency and improve header compression ratios in all three types of architectures, but are especially beneficial for the fully distributed architecture.

Figure 2:
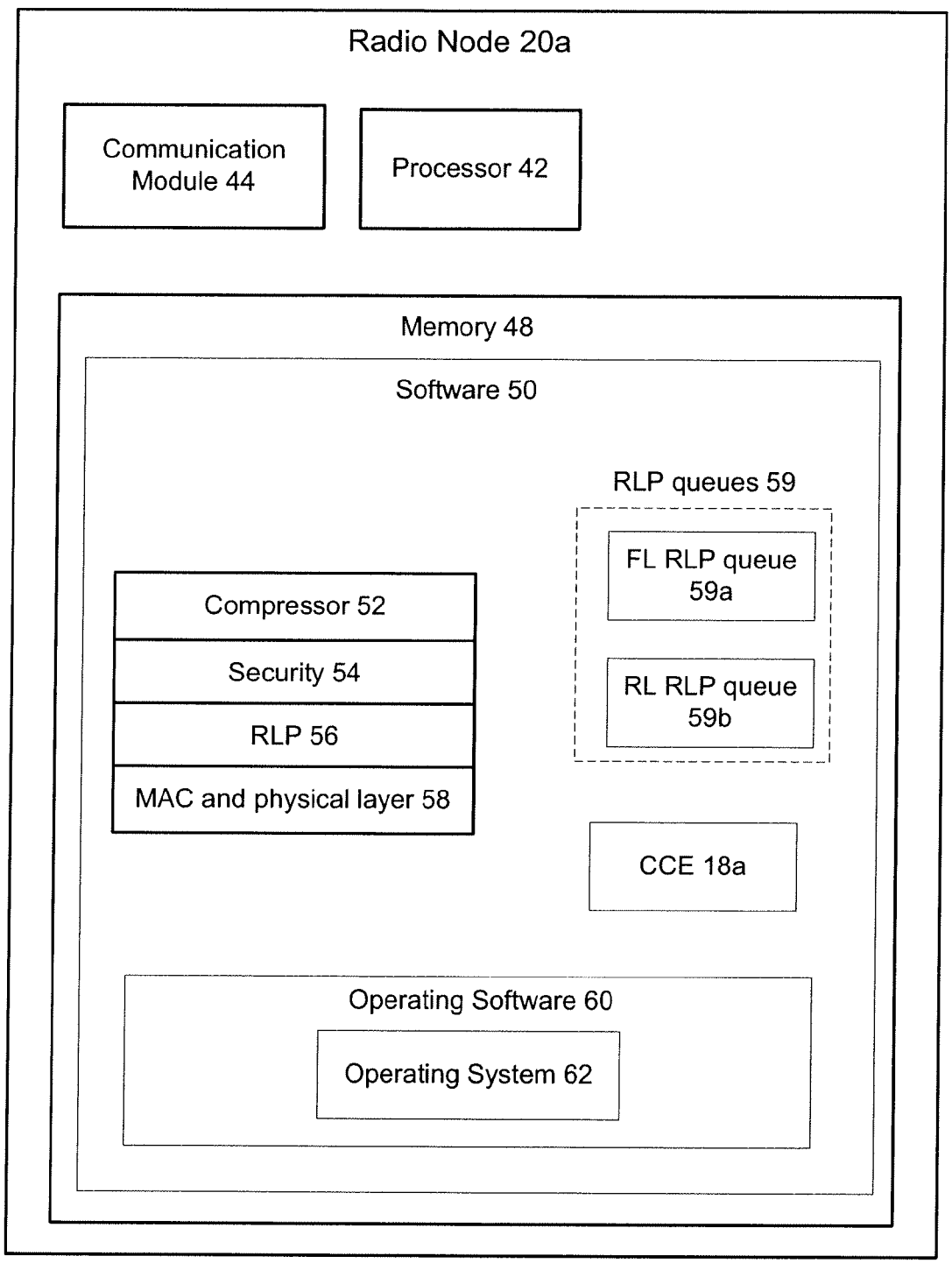
FIG. 2 is a block diagram of a radio node for use with the RAN of FIG. 1.

Referring to FIG. 2, a block diagram of the radio node 20*a* is shown. Radio nodes 20*b*-20*d* are similar both in structure and in function to the radio node 20*a*, though the integrated radio node 20*b* additionally includes RNEs 22. Therefore, only the radio node 20*a* is described in detail. The radio node includes one or more processor(s) 42 (referred to simply as "processor 42"), a communication module 44 for effecting communication with the access terminal 24 and the IP network 16, and memory 48 for storing software 50. The communication module 44 facilitates communication by applying one or more communication routines (e.g., TCP/IP protocols) for transmitting and receiving data over the IP network, an external network (not shown) and the AT 24. The processor 42 executes the software 50, which includes a data compressor and decompressor 52 (referred to simply as "compressor 52"), security protocols 54, RLP routines 56, MAC physical layer routines 58, RLP queues 59, a CCE 18*a*, and operating software 60. The operating software 60 includes an operating system 62, such as Linux® or vxWorks®. As describe above, the CCE 18*a* supports forward and reverse link channels established between the radio node 20*a* and an AT. The CCE 18*a* also performs physical layer functions as well as media access control (MAC) layer functions of the airlink. For each of the RLP routines, the compressor and the decompressor may optionally be part of a CCE or an RNE. This implies that, as discussed above, each of the RLP routines, the compressor and the decompressor may be located at an access point or an RNR.

The compressor 52 operates at the IP layer to compress and decompress headers of packets. The compressor 52 may implement robust header compression (ROHC) or other variants of ROHC. The compressor 52 can compress or decompress IP packet headers based on the static context only or based on both the static context and the dynamic context depending on the availability of historical context information, as described above. Security protocols 54 may be used to encrypt, decrypt and/or authenticate the packet. The RLP routines 56 operate at the RLP layer, which, as described above, is included in a number of digital communication standards, including the standards promulgated by the 3GPP, the 3GPP2 and the IEEE. The RLP routines break up an IP packet, which may be compressed and/or encrypted, into segments and assign a sequence number to each of the segments. The MAC and physical layer routines 58 (situated below the RLP layer) handle the transmission and reception of the segments to and from the AT 24 over the respective forward and reverse links of the airlink 26. During the course of the transmission, the radio node 20*a* may receive acknowledgment messages that indicate the segments that have been received successfully by the AT 24. The radio node 20*a* may also receive negative acknowledgment messages that indicate the segments that have not been received by the AT 24. The RLP routines 56 analyze the acknowledgement and negative acknowledgement messages and respond appropriately. For example, in response to receiving a negative acknowledgement message associated with a segment that had been previously sent, the RLP routines 56 typically retransmit the segment.

The RLP routines 56 also handle the receipt and assembly of segments received by the radio node 20*a* from the AT 24. The RLP routines 56 send an acknowledgement message to the AT 24 to indicate that a segment has been received successfully. The RLP routines 56 also send a negative acknowledgement to indicate that a segment has not been received and/or to request the AT 24 to resend the segment. After segments have been received, the RLP routines 56 reorder the segments in consecutive order to assemble the IP packet. The security protocols 54 may decrypt and/or authenticate the IP packet, and the compressor 52 decompresses the packet header using historical information stored in the memory 48. Depending on the historical information available in the radio node 20*a*, the decompressor 52 may decompress the packet using only static context or using both static context and dynamic context.

The RLP queues 59 include a forward link (FL) RLP queue 59*a* for storing segments to be sent to the AT 24 over the forward link and a reverse link (RL) RLP queue 59*b* for storing segments received from the AT 24 over the reverse link. After the radio node 20*a* sends a segment stored in the FL RLP queue 59*a* and receives an acknowledgement from the AT 24 that the segment has been received, the processor 24 may delete the segment from the FL RLP queue 59*a*. After the radio node 20*a* assembles a packet from the segments stored in the RL RLP queue 59*b*, the processor 24 may flush those segments from the RL RLP queue 59*b*. The communication module 44, processor 42, and software 50 shown in FIG. 2 may also be incorporated into RNRs 12. The RLP queues also store static and dynamic contexts for use by the compressor 52. For instance the FL RLP queue 59*a* stores static and dynamic contexts related to communications on the forward link, and the RL RLP queue 59*b* stores static and dynamic contexts related to communications on the reverse link.

Figure 3:
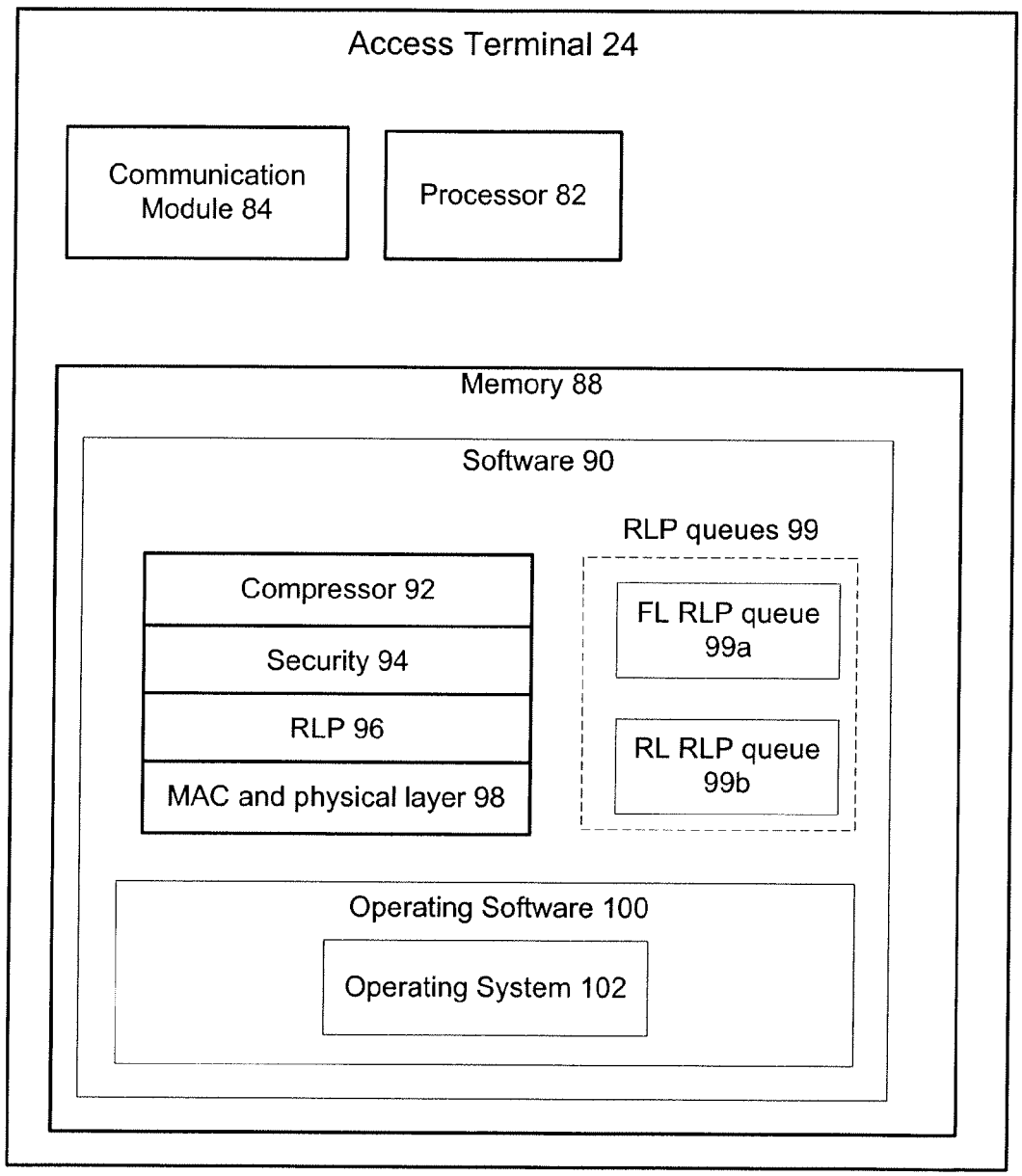
FIG. 3 is a block diagram of an access terminal for use with the RAN of FIG. 2.

Referring to FIG. 3, a block diagram of the access terminal 24 is shown. The AT 24 includes one or more processor(s) 82 (referred to simply as "processor 82"), a communication module 84 for effecting communication with any of the radio nodes 20 (e.g., radio node 20*a*), and memory 88 for storing software 90. The communication module 84 facilitates communication by applying one or more communication routines (e.g., TCP/IP protocols) for transmitting and receiving data over the respective reverse and forward links of the airlink 26. The processor 82 executes the software 90, which includes a data compressor and decompressor 92 (referred to simply as "compressor 92"), security protocols 94, RLP routines 96, MAC physical layer routines 98, RLP queues 99, and operating software 100. The operating software 100 includes an operating system 102, such as Linux® or vxWorks®.

Like the compressor 52 (shown in FIG. 2), the compressor 92 of the AT 24 operates at the IP layer to compress and decompress headers of packets. The compressor 92 may implement robust header compression (ROHC) or other types of header compression, such as variants of ROHC. The compressor 92 can compress or decompress IP packet headers based on the static context only or based on both the static context and the dynamic context, as described above. Security protocols 94 may be used to encrypt, decrypt and/or authenticate the packet. The RLP routines 96 operate at the RLP layer, which, as described above, is included in a number of digital communication standards, including the standards promulgated by the 3GPP, the 3GPP2 and the IEEE. The RLP routines 96 break up an IP packet, which may be compressed and/or encrypted, into segments and assign a sequence number to each of the segments. The MAC and physical layer routines 98 (situated below the RLP layer) handle the transmission and reception of the segments to and from the radio node 20*a* over the respective forward and reverse links of the airlink 26. During the course of the transmission, the AT 24 may receive acknowledgment messages that indicate the segments that have been received successfully by the radio node 20*a*. The AT 24 may also receive negative acknowledgment messages that indicate the segments that have not been received by the radio node 20*a*. The RLP routines 96 analyze the acknowledgement and negative acknowledgement messages and respond appropriately. For example, in response to receiving a negative acknowledgement message associated with a segment that had been previously sent, the RLP routines 96 typically retransmit the segment.

The RLP routines 96 also handle the receipt and assembly of segments received by the AT 24 from the radio node 20*a*. The RLP routines 96 send an acknowledgement message to the radio node 20*a* to indicate that a segment has been received successfully. The RLP routines 96 also send a negative acknowledgement to indicate that a segment has not been received and/or to request the radio node 20*a* to resend the segment. After segments have been received from the radio node 20*a*, the RLP routines 96 reorder the segments in consecutive order to assemble the IP packet. The security protocols 94 may decrypt and/or authenticate the IP packet and the compressor 92 decompresses the packet header using historical information stored in the memory 88. Depending on the historical information available in the AT 24, the decompressor 92 may decompress the packet using only static context or using both static context and dynamic context.

The RLP queues 99 include a forward link (FL) RLP queue 99*a* for storing segments received from the radio node 20*a* over the forward link and a reverse link (RL) RLP queue 99*b* for storing segments that are to be sent to the radio node 20*a* over the reverse link. After the AT 24 sends a segment stored in the RL RLP queue 99*b* and receives an acknowledgement from the radio node 20*a* that the segment has been received, the processor 84 may delete the segment from the RL RLP queue 99*b*. After the AT 24 assembles a packet from the segments stored in the FL RLP queue 99*a*, the processor 82 may flush those segments from the FL RLP queue 99*a*. As described further below, during a handoff, the RLP queues 59 of the radio node 20*a* and the RLP queues 99 of the AT 24 may be controlled (e.g., populated and flushed) in a variety of ways depending on the particular handoff scheme that is implemented. The RLP queues 99 also store static and dynamic contexts for use by the compressor 92. For instance the FL RLP queue 99*a* stores static and dynamic contexts related to communications on the forward link, and the RL RLP queue 99*b* stores static and dynamic contexts related to communications on the reverse link.

An active handoff occurs when the AT 24 is active, as opposed to a dormant handoff that occurs when the AT 24 is dormant (e.g, without an active call). During a handoff, the call may be transferred from one radio node (e.g., radio node 20*a*) to another radio node (radio node 20*b*). The call may also be transferred between different RNEs. For example the call may be transferred between different RNEs of the same RNR (e.g., a first RNC to a second RNC contained with RNEs 14*a*) or between RNEs belonging to different RNRs (e.g., RNEs 14*a* of RNR 12*a* and RNEs 14*b* of RNR 12*b*). A handoff performed between radio nodes is referred to as an "inter-CCE handoff" and a handoff performed between RNEs is referred to as an "inter-RNE handoff."

As each of the RNEs 14 has connectivity to all CCE's 18 of radio nodes 20 in the RAN 10, it is possible to implement handoffs between radio nodes 20 without requiring an inter-RNE handoff. However, inter-RNE handoffs may be implemented in various situations. For example, in RANs with multiple RNRs, an inter-CCE handoff may be followed by an inter-RNE handoff in order to reduce the use of resources of the network 16. During an inter-RNE handoff, a target RNR that incurs the least routing cost (e.g., requires the least amount of router hops) is selected to serve the AT. Routing cost, in general, scales with the number of router hopes between the target RNR and the cell site where the serving CCE is located. Therefore, as the AT moves within the coverage area of the RAN 10, inter-RNE handoffs, although not required, could be performed to lower routing costs and to avoid delays caused by unnecessary router hops. Thus, inter-RNE handoffs may be performed more frequently in distributed architectures (where backhaul increase will occur in the expensive access links) than in centralized or semi-distributed architectures where the backhaul increase occurs in high-speed inter-router links.

Figure 4A:
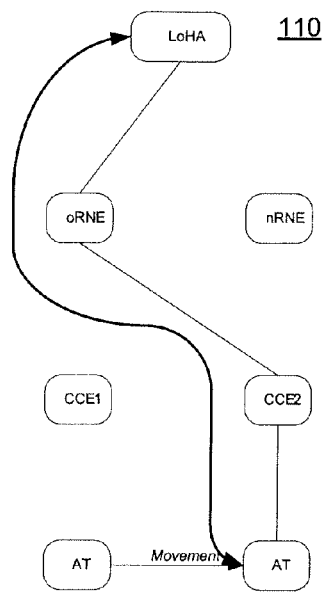
FIGS. 4A-4D show a schematic overview of an active handoff.

Referring to FIGS. 4A-4D, an active inter-RNE handoff transfers a call from an "old" RNE or "oRNE," which is currently servicing a call with the AT, to a "new" RNE or "nRNE." FIG. 4A shows the first stage 110 of the handoff where the AT is active and has just moved from a CCE of a first radio node (labeled "CCE1") to a CCE of a second radio node (labeled "CCE2"). A local home agent ("LoHA") that is local to the RAN acts as a local router to report reachability for the AT to other networks and maintains a mobility binding to the oRNE. Alternately, depending on the kind of network, the LoHA could be replaced with a regular home agent (HA) or equivalent. As the AT's session is moved from the oRNE to the nRNE, the mobility binding is updated using standard Mobile IP registration procedures. As the connection is active, user data is flowing over a path connecting the LoHA, the oRNE, and CCE2. A handoff trigger at the oRNE initiates the inter-RNE handoff procedure. The oRNE may trigger the inter-RNE handoff based on routing, load balancing or other considerations.

Figure 4B:
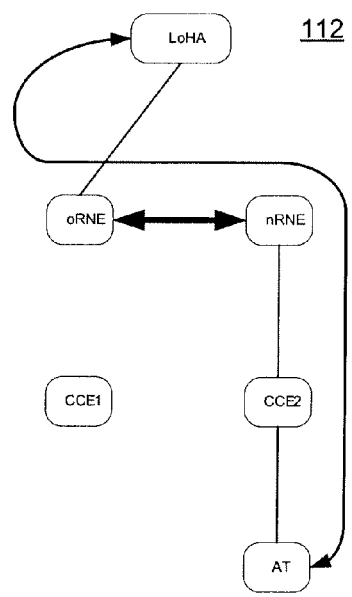
Figure 4C:
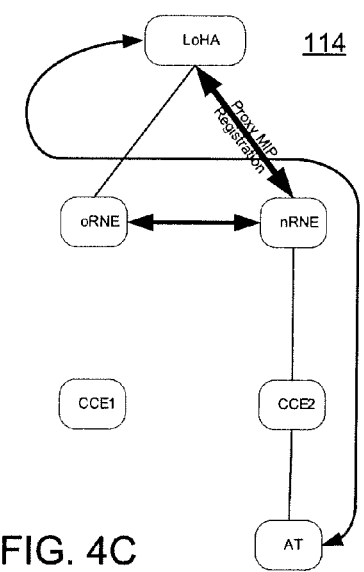

The second and third stages of the handoff 112 and 114, shown in FIGS. 4B and 4C, respectively, are implemented at the RLP layer. As shown in FIG. 4B, in preparation for the next stage of the handoff, the oRNE sets up an IP Tunnel between the oRNE and nRNE. The RNE-to-CCE tunnel endpoint is also moved from the oRNE to the nRNE. User data then flows over a path including the LoHA, the oRNE, the nRNE, and the CCE2. After the endpoint has been transferred, all reverse link traffic channel packets are sent by the CCE2 to the nRNE, which then tunnels them to the oRNE. All forward link traffic channel packets are tunneled by the oRNE to the nRNE, which then forwards them to the CCE2.

As shown in FIG. 4C, after a while, the entire session state, including the RLP state, is transferred from the oRNE to the nRNE. During the session state transfer, the oRNE first stops all processing at the RLP layer and transfers its session state to the nRNE. The oRNE also begins to forward IP packets arriving from the network directly to the nRNE. The nRNE also stops tunneling reverse link segments to the oRNE, and stores all received segments in a local buffer. As soon as call control is initialized at the nRNE with the received session state, nRNE starts processing segments at the RLP layer. At the end of this stage, the nRNE will have taken over the entire processing at the RLP layer; however, the IP end point remains at the oRNE because user IP packets are still traversing the oRNE, i.e. forward and reverse IP packets traverse LoHA-oRNE-nRNE path. After the entire session state is transferred from the oRNE to the nRNE, the LoHA is notified to change its routing of IP packets for the AT.

Figure 4D:
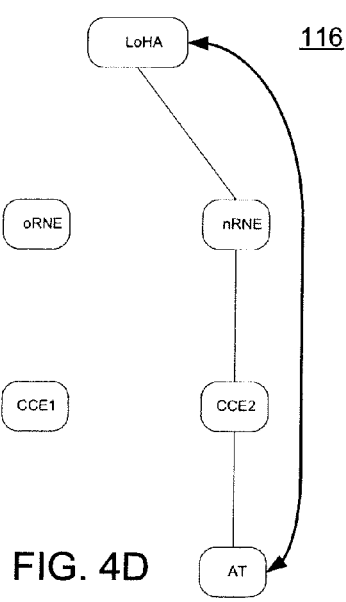

Referring to FIG. 4D, the fourth stage 116 of the handoff is implemented at the IP layer. Here, the nRNE performs a Mobile IP registration with the LoHA, and the LoHA forwards IP packets to the nRNE's care-of-address, and the nRNE tunnels IP packets directly to the LoHA. The resulting data path at the end of handoff includes the CCE2, the nRNE, and the LoHA.

Figure 5:
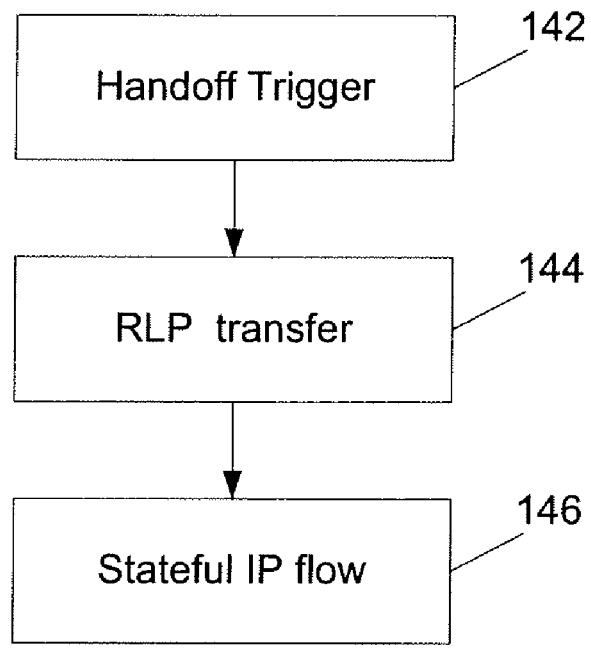
FIG. 5 is a flow diagram of an overall handoff process.

Referring to FIG. 5, an overall handoff process 140 is facilitated by two different RNEs. As discussed above, the handoff is triggered (142) by the RNE or access point servicing the call. The handoff may be triggered (142), for example, when the AT moves from one cell to another, when the AT moves beyond a certain distance, or when the servicing RNE (or access point) determines that the number of calls it is supporting has approached a high load and thus needs to transfer one or more of the calls to another RNE or access point. After the handoff has been triggered (142), the servicing RNE or access point transfers its RLP information, including RLP state information, to the new RNE or access point. After the RLP transfer has been completed, the handoff process 140 performs a "stateful IP flow" transfer (144) in which dynamic and static context information is sent to the new RNE or access point and used to initialize its compressor and decompressor. For ease of explanation, the term "compressor" refers to both the compressor and the decompressor.

As we propose below, the RLP transfer process (142) and the stateful IP flow process (144) can be performed in a variety of different ways. FIGS. 6-9 show different methods for implementing the RLP transfer process (142), and FIGS. 10-14 show different methods for implementing the stateful IP flow process (144). For ease of explanation, the processes of FIGS. 6-14 are described with respect to a handoff performed between two access points. These processes could also be performed the same way between two RNEs.

Figure 6:
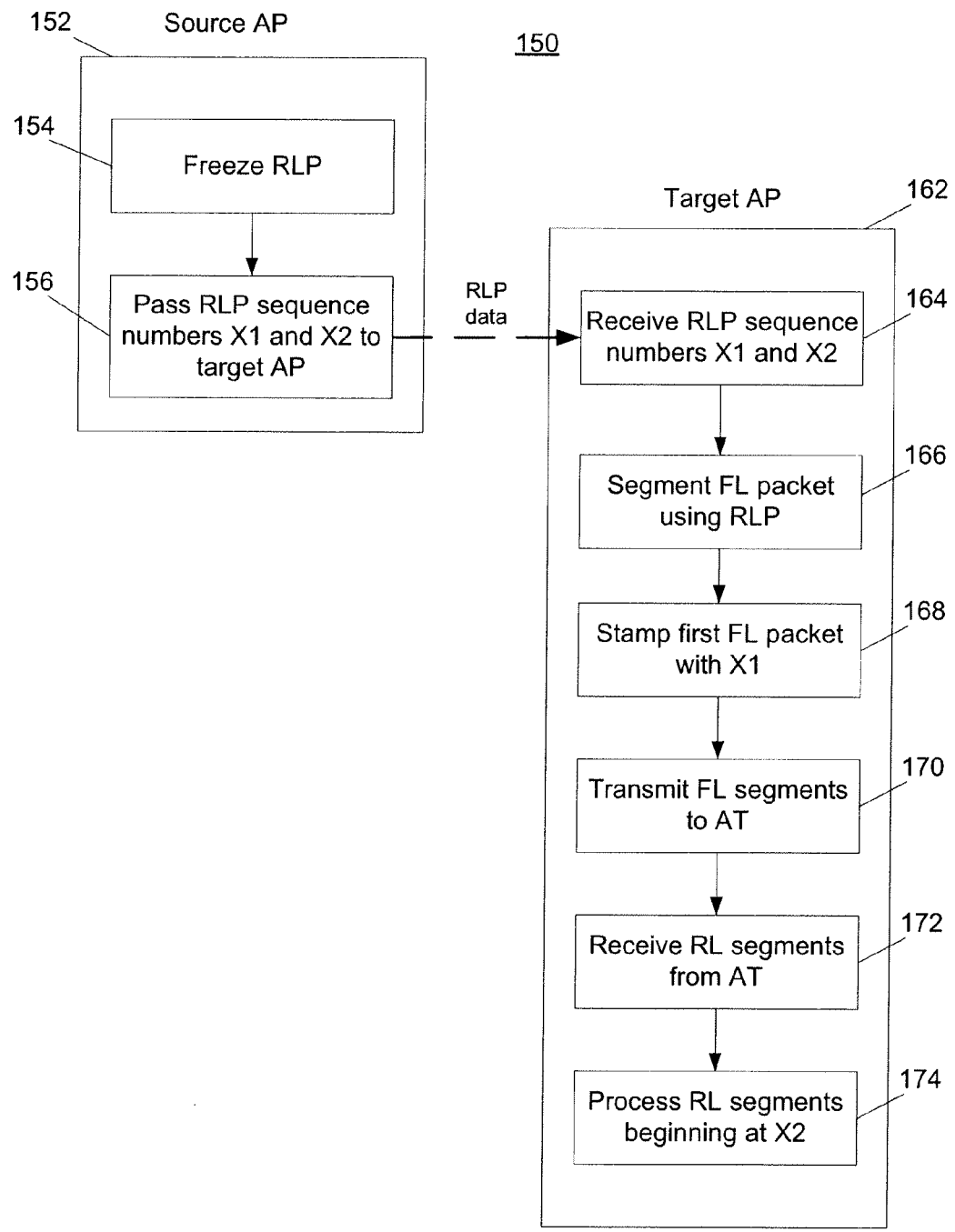
FIGS. 6-9 are flow diagrams of radio link protocol (RLP) transfer processes.

Referring to FIG. 6, a first RLP transfer process 150 of a handoff is implemented between a source AP (e.g., RN 20a of FIG. 1) and a target AP (e.g., RN 20b of FIG. 1). The source AP services the call before the handoff, and the target AP services the call after the handoff. The RLP transfer process 150 includes a process 152 performed by the source AP and a process 162 performed by the target AP. For ease of explanation, hereinafter, a handoff process implemented by the source AP is referred to as a "source AP handoff process" and a handoff process implemented by the target AP is referred to as a "target AP handoff process." The source AP handoff process 152 begins by freezing (154) the RLP state of the source AP. The process 152 then passes (156) to the target AP, the RLP sequence numbers X1 and X2 for the forward and reverse links respectively. The sequence number X1, as may be determined by the source AP, is the sequence number that the target AP should use to stamp the first RLP segment that the target AP forms from the first full IP packet it processes for the forward link. Similarly, the sequence number X2, as may be determined by the source AP, is the sequence number of the first RLP segment that the target AP should start its reverse link RLP processing from.

The target AP handoff process 162 receives (164) the RLP sequence numbers X1 and X2, that may be sent from the source AP, and initializes its RLP to begin from sequence numbers X1 and X2. The process 162 divides (166) the IP packet into segments (referred to as FL segments) and assigns (168) a sequence number of X1 to the first FL segment. The target AP then transmits (170) the FL segments beginning at sequence number X1 to the AT. Over the reverse link, the target AP receives (172) segments from the AT (referred to as RL segments) and processes (174) the RL segments having sequence numbers of X2 or higher. Any FL segments having sequences numbers preceding X1 that have not been successfully sent to the AT over the forward link may be dropped by the source AP. Similarly any RL segments having sequence numbers preceding X2 may be dropped by the target AP. Thus, small data loss is possible when the control of the RLP is passed to the target AP using RLP transfer process 150. For example, data loss may occur if the source AP has received first segments of a packet but not the remaining segments of the packet when the source AP sends the RLP sequence numbers X1 and X2 to the target AP. In this scenario, a first portion of the packet is received by the source AP and the remaining portion is received by the target AP as the target AP does not receive the RL segments with sequence numbers preceding X2 and the source AP does not receive the RL segments with sequence numbers including and following X2.

Figure 7:
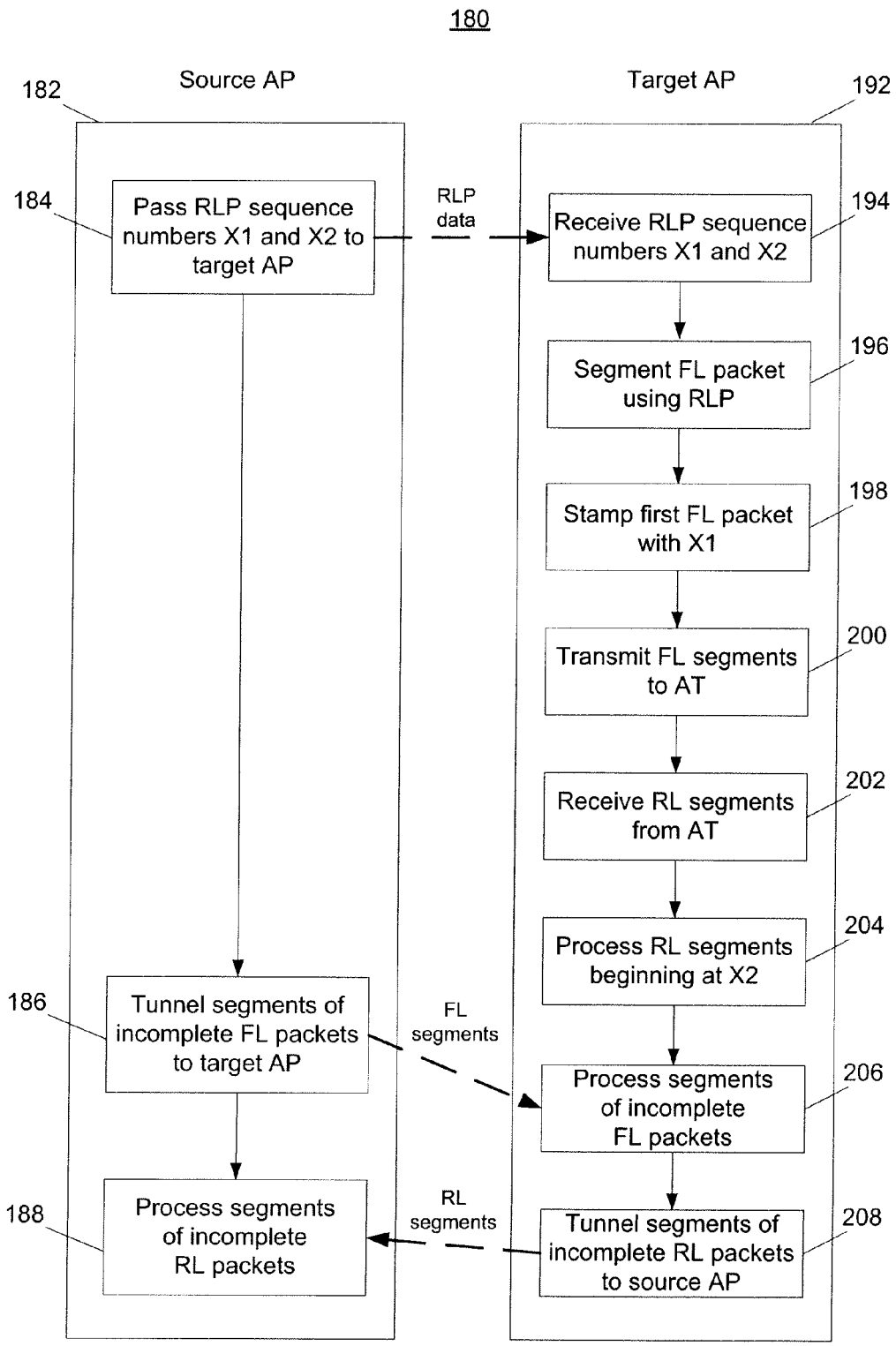

Referring to FIG. 7, a second RLP transfer process 180 of a handoff is implemented between a source AP and a target AP. The RLP transfer process 180 includes a source AP handoff process 182 and a target AP handoff process 192. The source AP handoff process 182 passes (184) to the target AP, the RLP sequence numbers X1 and X2 for the forward and reverse links, respectively. The sequence number X1, as may be determined by the source AP, is the sequence number that the target AP should use to stamp the first RLP fragment that the target AP forms from the first full IP packet it processes for the forward link. Similarly, the sequence number X2, as may be determined by the source AP, is the sequence number of the first RLP segment that the target AP should start its reverse link RLP processing from. Unlike the first handoff process 150 of FIG. 6, the source AP does not freeze its RLP before it passes (184) the RLP sequence numbers to the target AP.

The target AP handoff process 192 receives (194) the RLP sequence numbers X1 and X2 sent from the source AP and initializes its RLP to begin from sequence numbers X1 and X2. The process 162 divides (196) the packet into segments (referred to as FL segments) and assigns (198) the sequence number of X1 to the first FL segment. The target AP then transmits (200) the FL segments beginning at sequence number X1 to the AT over the forward link. Over the reverse link, the target AP receives (202) segments from the AT (referred to as RL segments) and processes (204) the RL segments having sequence numbers of X2 or higher.

If there are any FL segments at the source AP that have sequences numbers preceding X1 and that have not already been sent to the AT, the source AP tunnels (186) these segments to the target AP for further processing (206). In the first RLP transfer process 150 of FIG. 6, by contrast, these FL segments would have been dropped by the source AP. If any RL segments having sequence numbers preceding X2 have been received by the target AP, the target AP tunnels (208) those RL segments to the source AP for further processing (188). In the first RLP transfer process 150 of FIG. 6, by contrast, these RL segments would have been dropped by the target AP. Also, any feedback from the AT, e.g., positive or negative acknowledgements, for packet sequence numbers preceding X1 and X2 are also handled by the source AP. Unlike the first transfer process 150, the second RLP transfer process 180 ensures that no data loss occurs if there are segments of a partially transmitted packet that have not been transferred when the handoff occurred. Furthermore, the second RLP transfer process 180 compensates for incomplete transmissions occurring both on the forward link and on the reverse link. The first RLP transfer process 150, however, does not require tunnels to be set up in advance, and therefore incurs less overhead than the second RLP transfer process 180.

Figure 8:
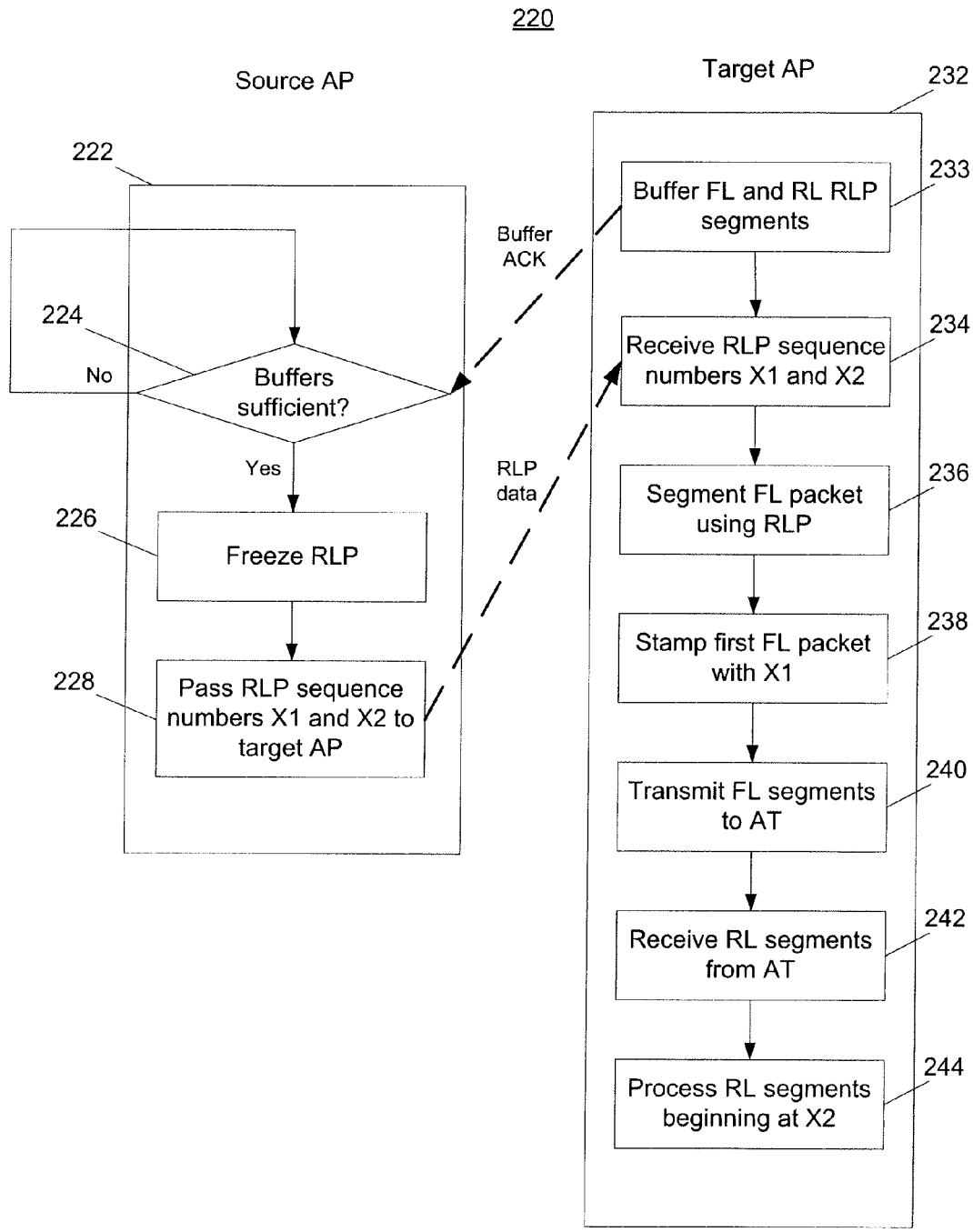

Referring to FIG. 8, a third RLP transfer process 220 of a handoff is implemented between a source AP and a target AP. The RLP transfer process 220 includes a source AP handoff process 222 and a target AP handoff process 232. The target AP handoff process 232 begins by buffering (233) the FL and RL RLP segments in memory of the target AP. (e.g., in RLP queues 59 of FIG. 2). When a sufficient number of segments have been buffered, the target AP may optionally notify the source AP, e.g., by sending an acknowledgement message indicating that sufficient buffering has been performed. Alternately, the source AP can infer this by noting the number of RLP segments it has received and transmitted since the RLP process began at the target AP. In some embodiments, the buffering is deemed sufficient when the RL segments of one or more full RL packets have been buffered and/or the FL segments of one or more full FL packets have been buffered.

The source AP handoff process 222 delays transferring control of the RLP to the target AP until it 222 determines (224) that the buffering is sufficient. In some embodiments, the source AP handoff process waits until it receives an acknowledgement message from the target AP. After the source AP handoff process 222 determines (224) that the buffering is sufficient, it freezes the RLP state of the source AP, otherwise it continues to wait for the target AP to buffer more FL and RL segments. After freezing (226) the RLP state, the source AP handoff process 222 passes (228) to the target AP, the RLP sequence numbers X1 and X2 for the forward and reverse links respectively. The sequence number X1, as may be determined by the source AP, is the sequence number that the target AP should use to stamp the first RLP fragment that the target AP forms from the first full IP packet it processes for the forward link. Similarly, the sequence number X2, as may be determined by the source AP, is the sequence number of the first RLP segment that the target AP should start its reverse link RLP processing from.

The target AP handoff process 232 receives (234) the RLP sequence numbers X1 and X2 sent from the source AP and initializes its RLP to begin from sequence numbers X1 and X2. The target AP handoff process 232 divides (236) the packet into segments (referred to as FL segments) and assigns (238) a sequence number of X1 to the first FL segment. The target AP then transmits (240) the FL segments beginning at sequence number X1 to the AT. Over the reverse link, the target AP receives (242) segments from the AT (referred to as RL segments) and processes (244) the RL segments having sequence numbers of X2 or higher.

As the target AP has built up a buffer of RL and FL segments, it can handle retransmission requests and feedbacks, eliminating or reducing the chance of data loss. Compared to the first RLP transfer process 150 of FIG. 6, the third RLP transfer process 220 is less likely to lose data, especially if there are segments of a partially transmitted packet that have not been transferred when the handoff occurred. However, the third RLP transfer process 220 incurs a delay after the handoff has been initiated to build up the buffers of the target AP. This delay involves the transfer of RLP control (not packet flow) and is typically on the order of a second or a fraction of a second. Furthermore, unlike the first RLP transfer process 150, where no buffering is performed, the third RLP transfer process 220 may require the target AP to have more memory to maintain the buffers.

In contrast to the third RLP transfer process 220, the second RLP transfer process 180 of FIG. 7 requires the FL and RL tunnels to be set up in advance which involves more overhead. However, in comparison to the second RLP transfer process, the third RLP transfer process 220 may require the target AP to have more memory to maintain the buffers.

Figure 9:
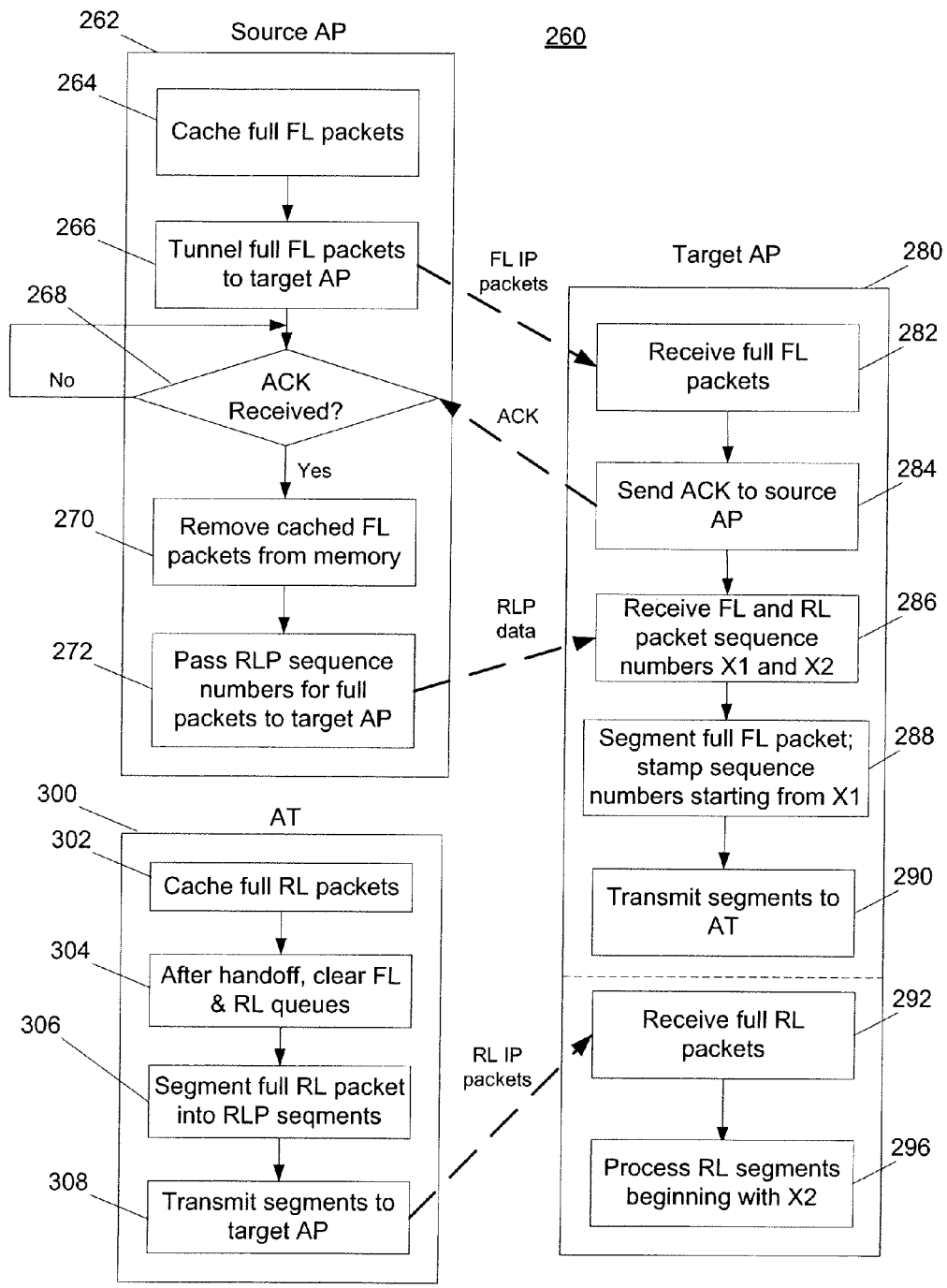

Referring to FIG. 9, a fourth RLP transfer process 260 of a handoff is implemented between a source AP and a target AP. The RLP transfer process 260 includes a source AP handoff process 262, a target AP handoff process 280, and a handoff process 300 performed by the AT (referred to as an "AT handoff process"). As part of its regular course of operation, the source AP handoff process 262 caches (264) full FL IP packets, which it sends to the AT, in the memory of the source AP. The cached packets are cleared once they are acknowledged for successful delivery over the air to the AT. Alternately, in some embodiments, the source AP may begin to cache the full IP packets in memory just before the handoff is initiated. Once the handoff for an AT is initiated, the source AP handoff process 262 tunnels (266) the cached IP packets to the target AP and the target AP handoff process 280 receives (282) the IP packets. In a similar fashion, the AT handoff process 300 caches (302) full RL IP packets that it sends to the source AP and tunnels (304) the packets to the target AP. The AT may cache the full IP packets until they are successfully acknowledged as part of its regular course of action, or alternately, it may start the caching just before the handoff is initiated. In some embodiments, the IP packets tunneled to the target AP from the source AP (266) and the IP packets cached by the AT (304) do not have any header compression or application of security protocols (e.g., encryption or authentication signature).

The IP packets cached by both the AT and source AP are cached with no header compression or application of security, though the AT and source AP typically apply security protocols and header compression before sending the packets to each other. When the target AP successfully receives a full FL IP packet sent from the source AP, the target AP handoff process 280 may optionally send (284) an acknowledgement message ("ACK") to the source AP.

The source AP maintains the full FL IP packet in memory until it determines (268) that the complete packet has been successfully acknowledged by the AT. When the source AP handoff process 262 determines (268) that the complete packet has been acknowledged, the process 262 removes (270) the full FL IP packet from memory. Likewise, the AT maintains the full RL packet in memory until it determines (306) that the complete packet has successfully been acknowledged by the access network. When the AT handoff process 300 determines (306) the complete packet has been acknowledged, the process 300 removes (308) the full RL packet from memory.

The source AP handoff process 262 passes (272) to the target AP, the packet sequence numbers X1 and X2 for the forward and reverse links respectively. The sequence number X1, as may be determined by the source AP, is the sequence number that the target AP should use to stamp the first RLP fragment that the target AP forms from the first full IP packet it processes for the forward link. Similarly, the sequence number X2, as may be determined by the source AP, is the sequence number of the first RLP segment that the target AP should start its reverse link RLP processing from.

The target AP handoff process 280 receives (286) the packet sequence numbers X1 and X2 sent from the source AP and initializes its RLP to begin processing FL and RL packets with sequence numbers X1 and X2. After the handoff, the Source AP tunnels the full IP packets to the target AP, beginning from the earliest unfinished or not completely acknowledged cached packet. The target AP handoff process 232 receives the tunneled packets, divides (288) the full packets into FL segments and stamps them with sequence numbers starting from X1 and transmits (290) the FL segments to the AT.

Over the reverse link, once the AT determines that the handoff has occurred, it discards any of the unfinished RL and FL segments and clears up its reverse and forward link RLP queues. It then re-starts its reverse link RLP processing by processing the unfinished, cached full IP packets, segmenting them and transmitting them over the reverse link to the target AP. The target AP receives segments from the AT (referred to as RL segments) and processes (296) the RL segments belonging to the RL packet having sequence number X2.

Since after the handoff, both the target AP and the AT re-start the RLP processing and transmission from full IP packets, the target AP does not need to keep track of which partial packets were sent or received before the handoff since it maintains and stores whole packets. Furthermore, there is no data loss because target has copies of the full RL and FL packets that were sent just before the handoff happens. Unlike the third RLP transfer method 180 of FIG. 7, the fourth RLP transfer method 260 does not need to maintain a buffer at the target AP; however, both the source AP and the AT are required to cache copies of the full packets that they send. The fourth RLP transfer method 260 may also require a small amount of redundant data transmission.

The following example illustrates an occurrence of redundant data transmission. The source AP prepares a FL packet to send to the AT, and the FL packet includes a total of four segments. Before the handoff, the source AP sends only the first and second segments of a FL packet to the AT; the third and fourth segments have not been sent. The target AP has also received a copy of the FL packet (see step 282) that was sent just before the handoff as well as the sequence number of the FL packet (see step 286). After the handoff occurs, the target AP again starts from first and second segments of the FL packet; therefore, AT receives the first and second segments from the target AP even though it had already received the same first and second segments from the source AP. The target AP also sends the third and further segments of the FL packet to the AT, the very segments that the source AP was not able to send before the handoff. Although there is some redundant transmission of the first and second segments, the third and fourth segments are not lost during the handoff.

After the handoff, along with the transferring of RLP from the source AP to the target AP, a stateful IP flow process of a handoff is implemented between the source AP, the target AP, and the AT. As described above with respect to FIG. 5, in general, a stateful IP flow controls how packets are processed at the IP level before, during, and after a handoff. Examples of such processing including header compression and decompression, such as ROHC. For ease of explanation, the following stateful IP flow processes, which are shown in FIGS. 10-14, are described as ROHC processes. However, in practice, the stateful IP flow processes may include any state-dependent process that is performed at the IP layer.

In many cases, before a handoff, the source AP and the AT compress and decompress the headers of the packets they send to each other using both static and dynamic context. During a call, the source AP and AT cache both reverse-link and forward-link RLP segments of unfinished packets (i.e., packets that have not been completely transmitted and received) until transmission of the packets is complete (i.e., the entire packet has been transmitted and received). As described above with respect to FIGS. 2 and 3, the source AP and AT each have a reverse-link RLP queue for caching RL RLP segments and a forward-link RLP queue for caching FL RLP segments.

Figure 10:
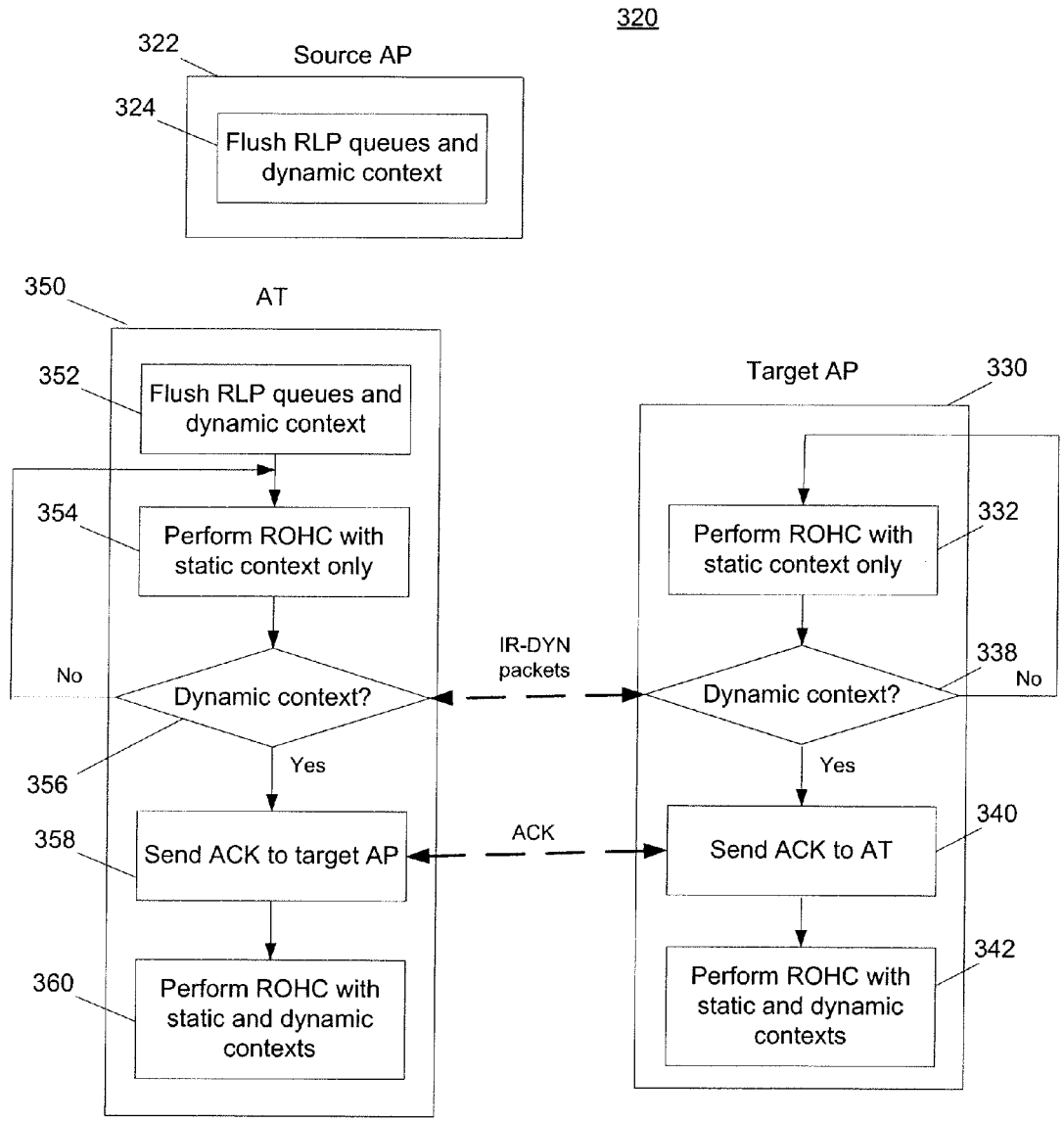
FIGS. 10-14 are flow diagrams of stateful IP flow processes.

Referring to FIG. 10, a first stateful IP flow process 320 includes a source AP handoff process 322, a target AP handoff process 330, and an AT handoff process 350. As part of its regular course of operation, the source AP handoff process caches full FL IP packets, which it sends to the AT, in the memory of the source AP. The cached packets are cleared once they are acknowledged for successful delivery over the air to the AT. Alternately, in some embodiments, the source AP may begin to cache the full IP packets in memory just before the handoff is initiated. Once the handoff for an AT is initiated, the source AP handoff process tunnels the cached IP packets to the target AP and the target AP handoff process receives the IP packets. In a similar fashion, the AT handoff process caches full RL IP packets that it sends to the source AP. The AT may cache the full IP packets until they are successfully acknowledged as part of its regular course of action, or alternately, it may start the caching just before the handoff is initiated. The IP packets tunneled to the target AP from the source AP and the IP packets cached by the AT do not have any header compression or application of security protocols (e.g., encryption or authentication signature).

Upon a handoff, once the RLP transfer is complete, the source AP handoff process 322 flushes the RLP queues of the source AP, including all partial packets remaining in the queues, and the dynamic context from the memory of the source AP. After the RLP transfer, the source AP is no longer involved in the handoff; therefore, the memory that had been used to store dynamic context is cleared as well as the RLP queues.

Upon sensing the initiation of a handoff, the AT handoff process 350 flushes the RLP queues of the AT, including all partial packets remaining in the queues, and the dynamic context from the memory of the AT. Both the AT handoff process 350 and the target AP handoff process 330 start their compressor state machines with either static context only or no context. Correspondingly, the decompressors at the target AP and the AT have either the static context or no context respectively. At this point, the compressors at the Target AP and the AT would perform ROHC using static context only (steps 332 and 354, respectively) or no context. The source AP may transfer the static context to the target AP's decompressor in advance, in preparation for the handoff. The AT's decompressor may retain the static context from before the handoff. The target AP processes 332 the packets with ROHC (static context only, or no context) including any packets tunneled to the target AP from the source AP during the RLP transfer process (e.g., RLP transfer process 260, shown in FIG. 9), as these packets had been tunneled to the target AP without any header compression. The first few packets transmitted between the target AP and the AT include information regarding the dynamic context of the packets. From the first few packets, the decompressors at the target AP and the AT determine (e.g., extract) the dynamic context. The target AP handoff process 330 and the AT handoff process may initialize (338 and 356) the decompressor at the other end with the dynamic context by sending IR-DYN packets to each other. The IR-DYN packets include the dynamic context.

Both the AT and the target AP continue to process packets with ROHC using static context only until they receive (338 and 356) the IR-DYN packets from the other end and send (340 and 358) an acknowledgement (ACK) indicating that each of their respective decompressors has been initialized with the dynamic context. After the ACK has been sent from the AT and received (340) by the target AP and vice versa (358), both the AT handoff process 350 and target AP handoff process 330 perform ROHC using both static and dynamic contexts (steps 360 and 342, respectively).

Figure 11:
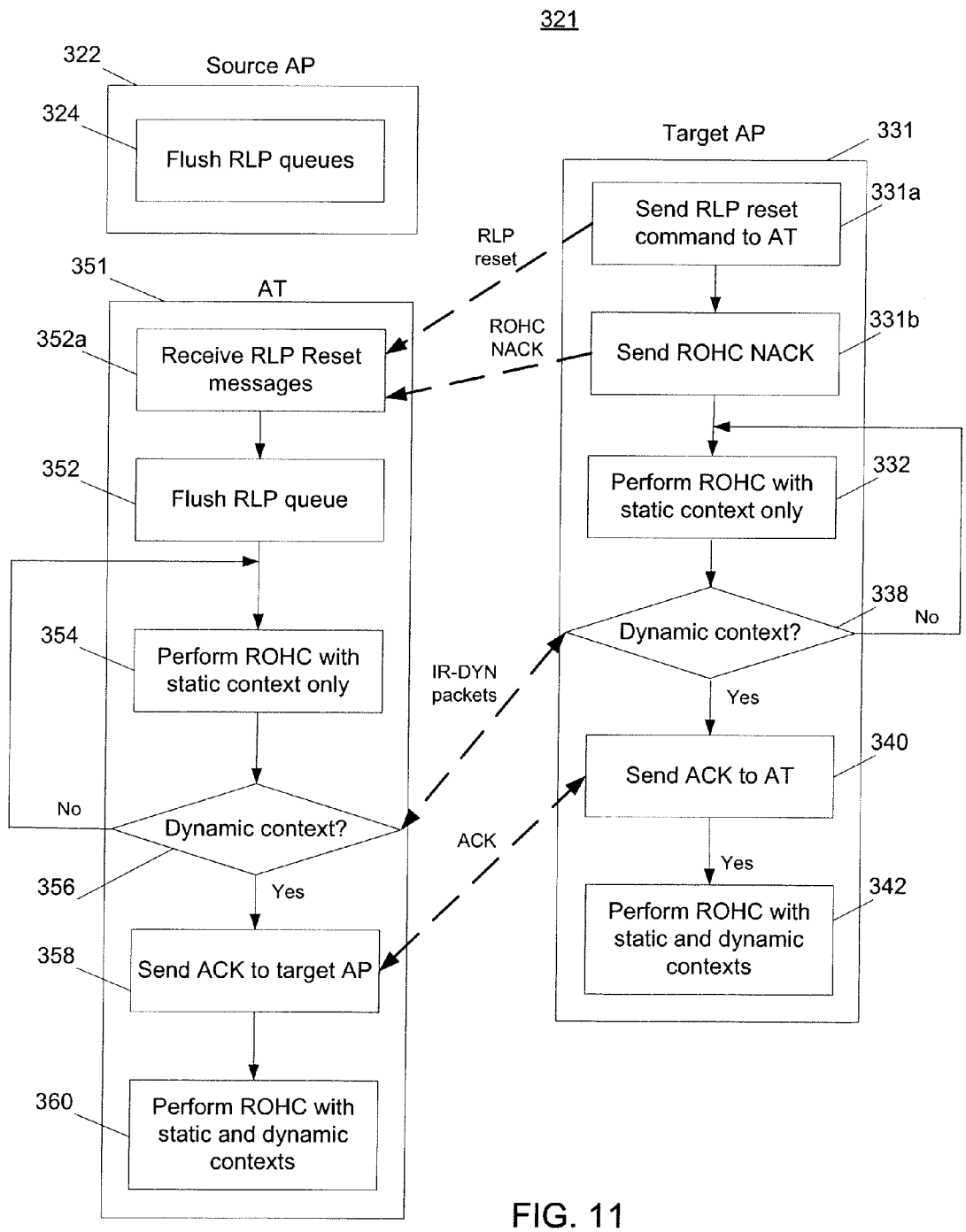

Referring to FIG. 11, a second stateful IP flow process 321 includes a source AP handoff process 322, a target AP handoff process 331, and an AT handoff process 351. The source AP handoff process 322 is the same as that of the stateful IP flow process 321 shown in FIG. 10. Source AP caches the full IP packets and tunnels them to the target AP upon handoff. The target AP handoff process 331 is the same as target AP handoff process 330 of the stateful IP flow process 320 of FIG. 10 except that the process 321 includes the steps of (1) sending (331a) an RLP reset command to the AT and (2) sending (331b) a command in the form of a ROHC NACK message to cause the ROHC compressor of the AT to remove any dynamic context built up before the handoff. After sending the ROHC NACK, the target AP handoff process 331 performs (332) ROHC with static context only and completes the other processes (336, 338, 332, 340, and 342) described above with respect to FIG. 10.

The AT handoff process 351 of the second stateful IP flow process 321 is the same as the AT handoff process 350 of the first stateful IP flow process 320 of FIG. 10 except that the AT handoff process 351 of the second stateful IP flow process 321 is initiated in response to receiving (352a) the RLP reset and ROHC NACK commands from the target AP. By contrast, the AT handoff process 350 of the first stateful IP flow process 320 (FIG. 10) is initiated by the AT autonomously without input from the target AP. Another difference from FIG. 10 is that the AT does not need to cache any IP packets before the handoff, as was needed in the previous approach. In this regard, the second stateful IP flow process 321 differs from the first stateful IP flow process 320 of FIG. 10 in that the target AP of the second stateful IP flow process 321 initiates the AT handoff process. To perform the AT handoff process 350 of the first stateful IP flow 320 (FIG. 10) an AT may need to be modified (e.g., reprogrammed) to autonomously flush (352) its RLP queues and dynamic context at the appropriate time, and to cache the IP packets until fully acknowledged during its regular course of operation. If an AT, such as a legacy AT, cannot be modified (e.g., reprogrammed), the second stateful IP flow process 321 of FIG. 11, which uses commands sent from the target AP to initiate the AT handoff process 351, may be used instead of the first stateful IP flow process 320 of FIG. 10.

The first and second stateful IP flows 320 and 321 can be used with the fourth RLP transfer method 260 of FIG. 9. The first and second stateful IP flows 320 and 321 are generally not used with the first, second, and third RLP transfer methods 150 (FIG. 6), 180 (FIG. 7), and 220 (FIG. 8), respectively, though in some embodiments, modifications may be made so that the stateful IP flows 320 and 321 may be used with any one of the first, second, and third RLP transfer methods 150, 180, and 220.

Figure 12:
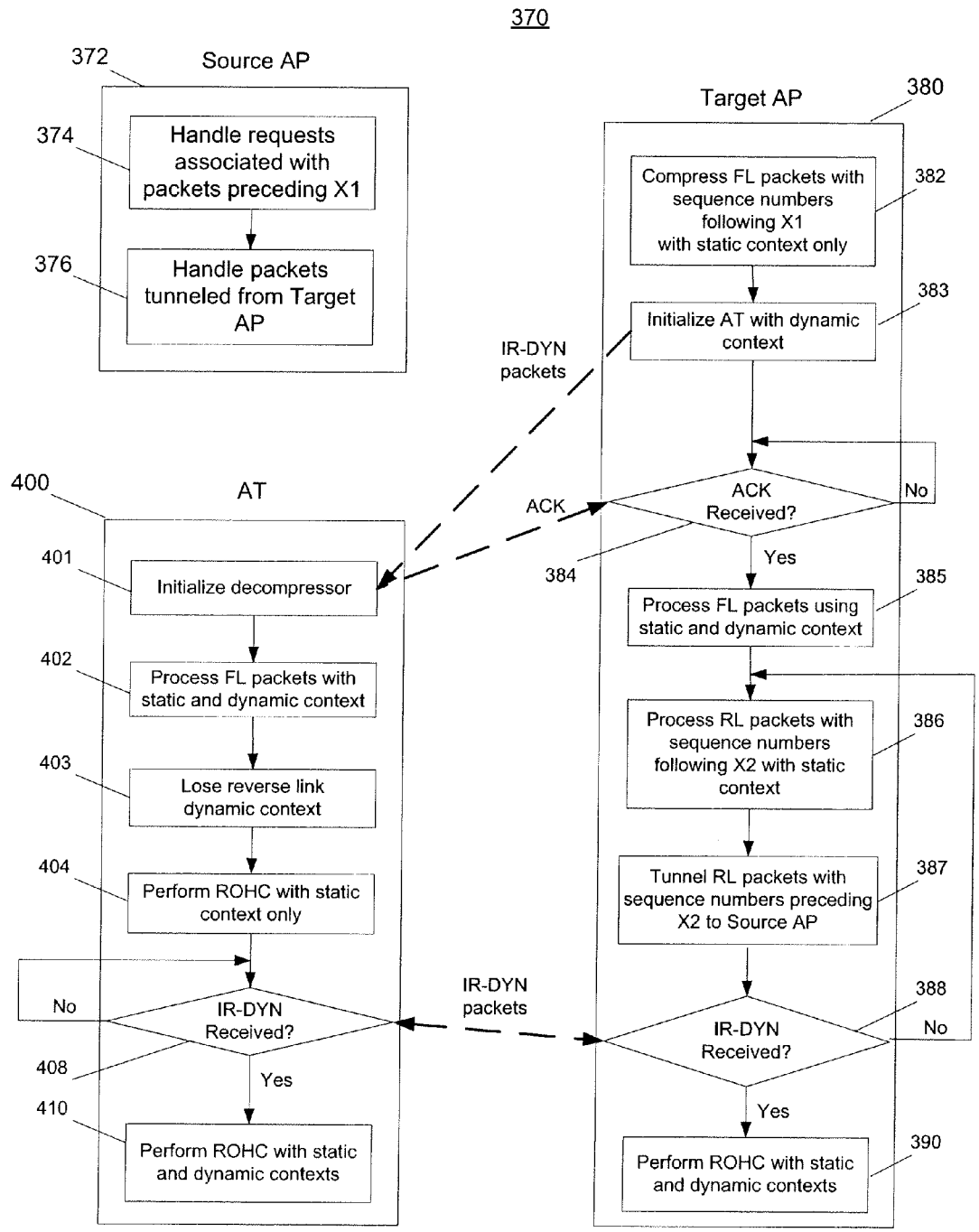

Referring to FIG. 12, a third stateful IP flow process 370 includes a source AP handoff process 372, a target AP handoff process 380, and an AT handoff process 400. The source AP indicates to the target AP the sequence numbers X1 and X2 to begin the forward link and reverse link processing from. For the forward link, the target AP handoff process 380 compresses (382) the FL IP packets that have sequence numbers following X1 using static context only and sends the FL packets to the AT over the air. The target AP may get the FL static context from the packets. For any remaining fragments at the source AP with sequence number preceding X1, the source AP continues to process them and tunnels them to the target AP for transmission to the AT over the air. The source AP may also handle (374) any acknowledgement and retransmission requests for the packets preceding sequence number X1.

The AT handoff process 400 begins by flushing the reverse link dynamic context only—the forward link dynamic context is still intact. At this point, the AT receives FL packets that were processed by both the source AP and the target AP using different context information. As the AT's FL decompressor has the dynamic context information, it is able to process the packets. The AT may need to handle out of order FL packets coming from the source AP and the target AP. For this, the AT may use a small sequence numbering to reorder the packets, or modify the interpretation interval offset, an explanation of which can be found in the article by G Pelletier, L-E. Jonsson, K. Sandlund, "Robust Header Compression (ROHC): ROHC over Channels That Can Reorder Packets," IETF RFC 4224, January 2006.

Alternatively, the AT may use separate queues for FL packets received from source AP and target AP to distinguish packets coming out of order and process them with appropriate context information to decompress the headers. The target AP handoff process 380 then initializes (383) the compressor of the AT with the dynamic context by sending IR-DYN packets to the AT. The IR-DYN packets include the dynamic context. The AT receives the IR-DYN packets and uses them to initialize (401) its decompressor. Once the target AP compressor receives (384) an acknowledgement indicating that the AT's FL decompressor has the context information, it can then begin to compress (385) the FL packet headers fully using both the static and the dynamic context. The AT also processes (402) the FL packets using both the static and dynamic context.

For the reverse link, the AT handoff process 400 compressor loses (403) its dynamic context information right at the time of the handoff to the target AP. The target AP decompressor starts off with only the static context information. The target AP may get the static context from the source AP as part of the handoff preparation phase, just before the actual handoff. Right after the handoff, the AT's compressor performs header compression using only the static information (404). The AT may still have unfinished fragments from before the handoff that are awaiting transmission or retransmission.

The target AP RL decompressor starts processing (386) packets following the sequence number X2, as indicated by the source AP, using static information available. Any packets received by the target AP preceding the sequence number X2 are tunneled (387) to the source AP which processes (376) them. This would include the unfinished fragments at the AT awaiting transmission from before the handoff. As these packets were compressed before the handoff using full context, the source AP would be able to process them which also has the full context from before the handoff. The first few packets transmitted by the AT to the target AP include information regarding the dynamic context of the packets. From the first few packets it receives from the AT, the target AP handoff process 380 determines the dynamic context. The AT compressor then initializes the decompressor at the target AP with the dynamic context by sending IR-DYN packets. The IR-DYN packets include the dynamic context. Both the AT and the target AP continues to process packets with ROHC using static context only until each of them receives IR-DYN packets from one another (steps 408 and 338). The AT and target AP initialize their compressors with the dynamic context included in the IR-DYN packets and from then on, both the AT handoff process 400 and target AP handoff process 380 perform ROHC using both static and dynamic contexts (steps 410 and 390, respectively).

Figure 13:
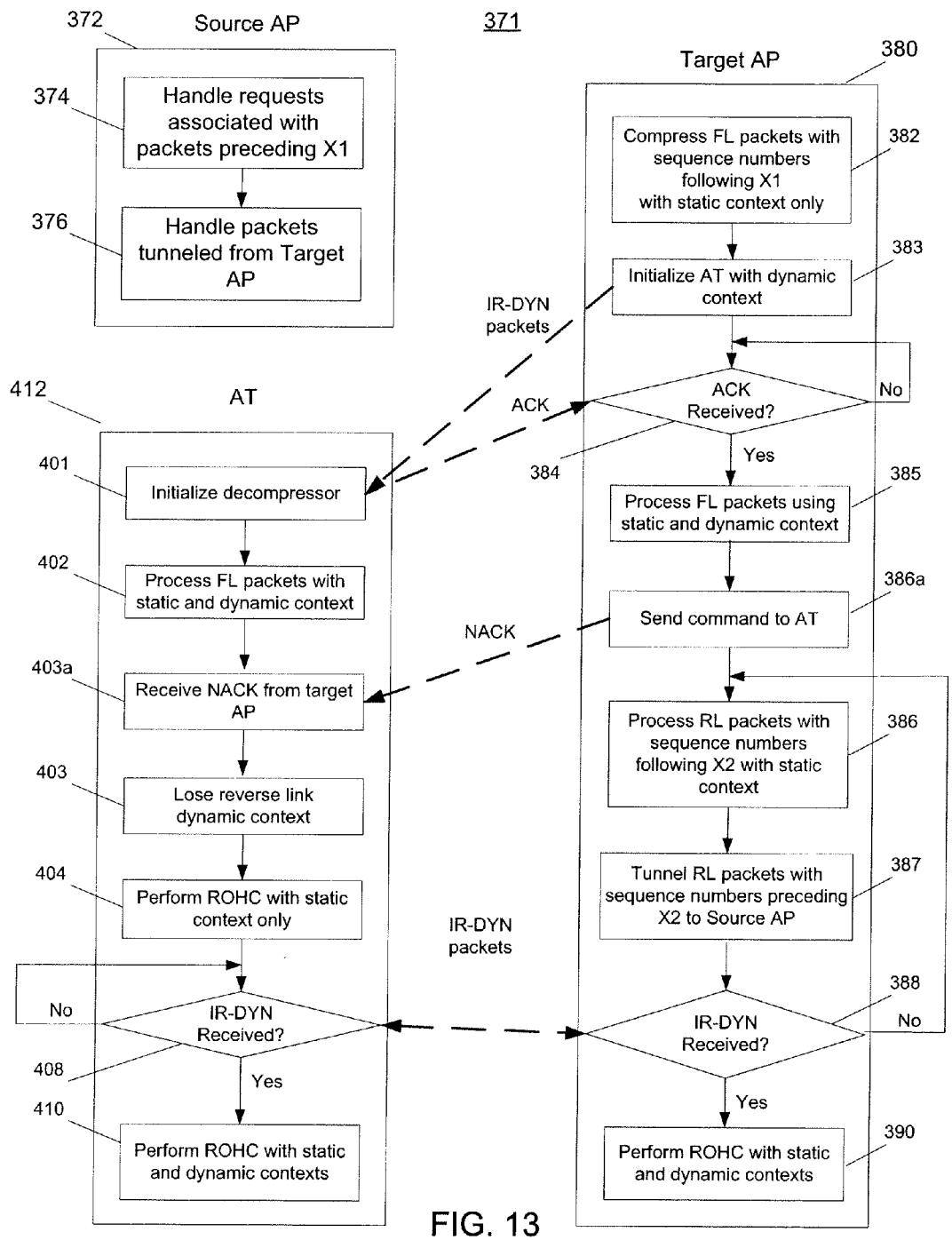

Referring to FIG. 13, a fourth stateful IP flow process 371 includes a source AP handoff process 372, a target AP handoff process 380, and an AT handoff process 401. The source AP handoff process 372 is the same as that of the third stateful IP flow process 370 shown in FIG. 12. The target AP handoff process 381 is the same as target AP handoff process 380 of the third stateful IP flow process 370 of FIG. 12 except that the process 381 includes the step of sending (386*a*) a command to the AT in the form of a ROHC NACK message to cause the ROHC compressor of the AT to remove any RL dynamic context built up before the handoff. The target AP handoff process 381 compresses (382) FL packets with sequence numbers following X1, performs (384) ROHC with static context only and completes the other processes (384, 385, 386, 387, 388, and 390) described above with respect to FIG. 12.

The AT handoff process 412 of the fourth stateful IP flow process 371 is the same as the AT handoff process 400 of the third stateful IP flow process 370 of FIG. 12 except that step 403 of the AT handoff process 412 of the fourth stateful IP flow process 371 is initiated in response to receiving (403*a*) the ROHC NACK command from the target AP. By contrast, step 403 of the AT handoff process 400 of the third stateful IP flow process 370 (FIG. 12) is initiated by the AT autonomously without input from the target AP. In this regard, the fourth stateful IP flow process 371 differs from the third stateful IP flow process 370 of FIG. 12 in that the target AP of the fourth stateful IP flow process 371 initiates part of the AT handoff process 412.

To perform the AT handoff process 400 of the third stateful IP flow 370 (FIG. 12), an AT may need to be modified (e.g., reprogrammed) to autonomously lose (e.g., delete from memory) (403) its RL dynamic context at the appropriate time. If an AT, such as a legacy AT, cannot be modified (e.g., reprogrammed), the fourth stateful IP flow process 371 of FIG. 13, which uses commands sent from the target AP to initiate step 403 of the AT handoff process 412, may be used instead of the third stateful IP flow process 370 of FIG. 12.

The third and fourth stateful IP flows 370 and 371 can be used with the first, second, and third RLP transfer methods 150 (FIG. 6), 180 (FIG. 7), and 220 (FIG. 8), respectively. The third and fourth stateful IP flows 370 and 371 are generally not used with the fourth RLP transfer method 260 of FIG. 9, though in some embodiments modifications may be made so that the stateful IP flows 370 and 371 may be used with the RLP transfer method 260 of FIG. 9.

Figure 14:
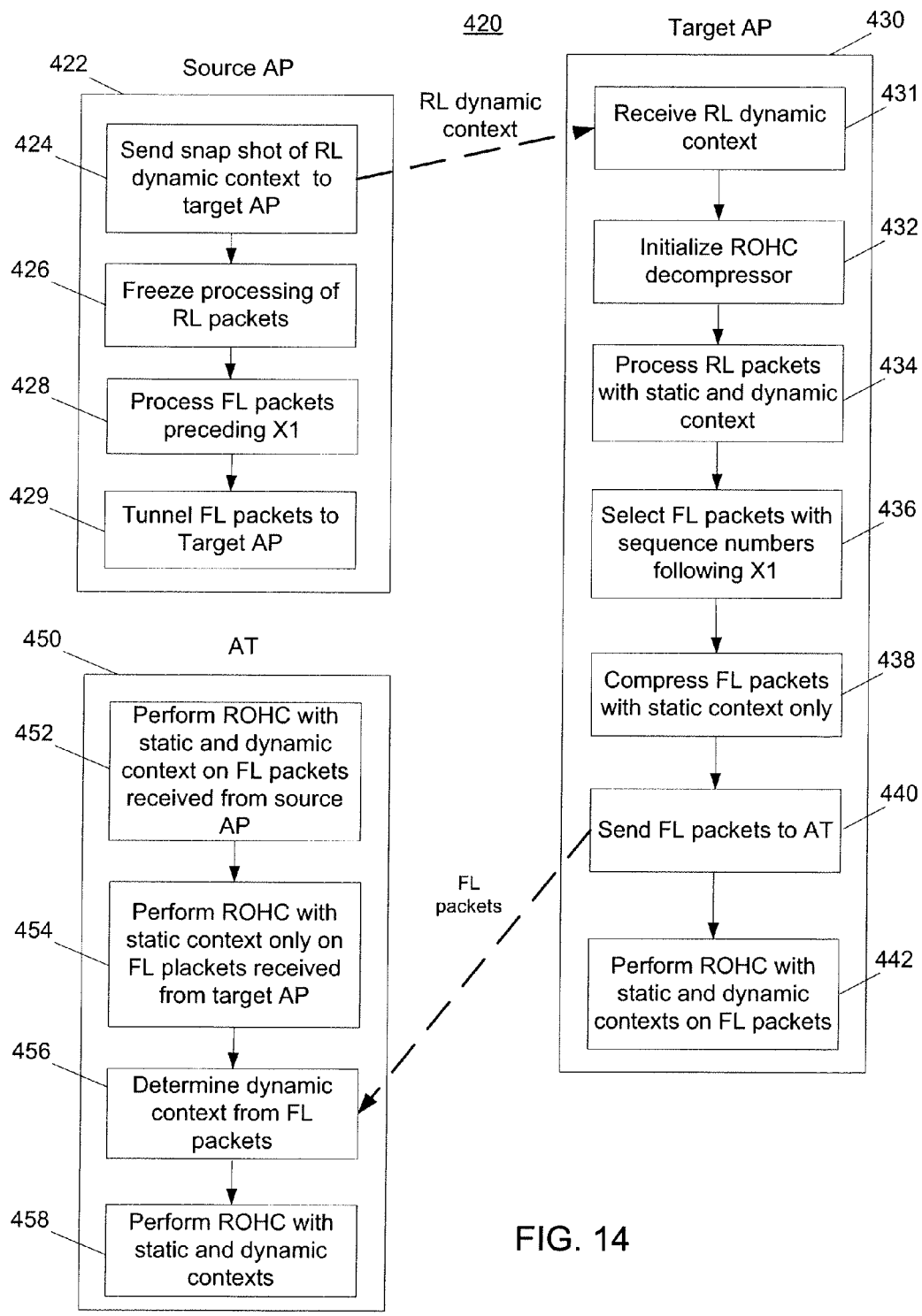

Referring to FIG. 14, a fifth stateful IP flow process 420 includes a source AP handoff process 422, a target AP handoff process 430, and an AT handoff process 450. Right at the time the AT hands off to the target AP, the source AP handoff process 422 takes a snap-shot of its dynamic and static ROHC context for the reverse link and sends (424) it to the Target AP. The Source AP handoff process 422 then freezes (426) the processing of any more reverse link packets. On the forward link, the source AP handoff process 422 indicates to the target AP the packet sequence number X1 to begin the forward link ROHC processing from. The source AP continues to retain the processing (428) of packets with sequence number preceding X1. This may include processing the acknowledgements and retransmission requests from the AT. The source AP tunnels (429) these packets to the target AP for transmission to the AT. The target AP may need to tunnel any related feedback from the AT to the source AP.

The target AP handoff process 430 receives (431) the RL dynamic context from the source AP and initializes (432) its ROHC decompressor with the RL dynamic context. The Target AP handoff process 430 processes (434) any received RL packets, which may have full header compression based on the already established header compression context (i.e., the static and the dynamic context received from the source AP). On the forward link, the target AP handoff process 380 selects (436) the FL packets with sequence numbers following X1 and compresses (438) the FL packets that have sequence numbers following X1 using static context only and sends the FL packets to the AT.

At this point, the AT receives FL packets that were processed by both the source AP and the target AP using different context information. That is, the AT processes (452) FL packets received from the target AP using static context only and processes (454) FL packets received from the source AP using both static and dynamic context. The AT may need to handle out of order FL packets coming from the source AP and the target AP. For this, the AT may use a small sequence numbering to reorder the packets, or modify the interpretation interval offset as described above. Alternatively, the AT may use separate queues for FL packets received from source AP and target AP to distinguish packets coming out of order and process them with appropriate context information to decompress the headers.

The first few FL packets transmitted (440) from the target AP to the AT include information regarding the dynamic context of the packets. From the first few packets, the decompressor on the AT for the forward link determines (456) the dynamic context of the FL packets. For example, the target AP handoff process 430 sends IR-DYN packets, which contain the dynamic context, to the AT to initialize the decompressor of the AT with the dynamic context. After the IR-DYN packets have been received, the target AP and the AT handoff process 450 can process FL packets using both static and dynamic contexts. For the remainder of their connection, the AT handoff process 450 and target AP handoff process 430 perform ROHC using both static and dynamic contexts (steps 458 and 442, respectively).

The fifth stateful IP flows 420 and 421 can be used with the first, second, and third RLP transfer methods 150 (FIG. 6), 180 (FIG. 7), and 220 (FIG. 8), respectively. The fifth stateful IP flows 420 and 421 are generally not used with the fourth RLP transfer method 260 of FIG. 9, though in some embodiments modifications may be made so that the stateful IP flows 420 and 421 may be used with the RLP transfer method 260 of FIG. 9. The choice of RLP transfer method and stateful IP flow to be used in a handoff process often depends on the specific application being implements (e.g., resource and timing requirements) as well as the resources available (e.g., memory, network resources, etc.).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. For example, the CCE's and RNE's can be viewed as software entities, hardware entities, and/or entities that include a combination of hardware and software.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

The following are examples for illustration only and not to limit the alternatives in any way. The techniques described herein can be performed in a different order and still achieve desirable results. Other embodiments are within the scope of the following claims.

What is claimed is:

1. A method comprising:
buffering a threshold number of data segments at a target network device, the data segments comprising data segments sent from a source network device to a client device and data segments sent from the client device;
handling one or more of retransmission requests and feedbacks using buffered data segments;
transmitting, to the source network device, a message notifying the source network device that the threshold number of data segments have been buffered;
receiving, at the target network device in response to transmitting, first and second sequence numbers from the source network device, the first sequence number corresponding to a data segment sent from the source network device to the client device, and the second sequence number corresponding to a data segment received by the source network device from the client device;
associating the first sequence number with the data segment sent to the client device;
associating the second sequence number with the data segment received from the client device; and
processing, at the target network device, data segments associated with sequence numbers that succeed the first and the second sequence numbers.

2. The method of claim 1, further comprising:
receiving the data segments having the sequence numbers that succeed the first and the second sequence numbers.

3. The method of claim 1, wherein processing, at the target network device, the data segments comprises applying a first processing technique at a first network layer, and wherein the method further comprises:
applying a second processing technique to the data segments, the second processing technique being performed at a second network layer, wherein the second network layer is higher than the first network layer.

4. The method of claim 3, wherein the second processing technique comprises performing stateful IP flow processing on the data segments.

5. The method of claim 4, wherein performing stateful IP flow processing comprises decompressing a packet header.

6. The method of claim 1, wherein processing at the target network device comprises using the first and the second sequence numbers associated with the data segments to verify that a complete packet has been received.

7. The method of claim 1, further comprising using the first and second sequence numbers to determine where to start processing forward link packets and reverse link packets.

8. The method of claim 1, wherein the data segments that are processed at the target network device are received over a first tunnel, and wherein the method further comprises:
receiving data segments over a second tunnel, the data segments received over the second tunnel being associated with sequence numbers that precede the first sequence number.

9. The method of claim 8, wherein the data segments received over the second tunnel belong to a packet.

10. The method of claim 8, wherein a decreased amount of data loss occurs during transfer of the communication connection from the source network device to the target network device relative to an amount of data loss expected to occur during transfer of the communication connection.

11. The method of claim 1,
wherein data segments buffered are sufficient to reconstruct packets of data transmitted during transfer of a communication connection from the source network device to the target network device.

12. The method of claim 1, further comprising:
transferring control of the communication connection from the source network device to the target network device.

13. The method of claim 12, wherein transferring control of the communication connection is initiated by the source network device.

14. The method of claim 12, wherein transferring control of the communication connection is initiated by the target network device.

15. The method of claim 12, wherein a decreased amount of data loss occurs during transfer of the communication connection from the source network device to the target network device relative to an amount of data loss expected to occur during transfer of the communication connection.

16. A system comprising:
one or more processors; and
a machine-readable storage device configured to store instructions that are executable by the one or more processors to perform operations comprising:
buffering a threshold number of data segments at a target network device, the data segments comprising data segments sent from a source network device to a client device and data segments sent from the client device;
handling one or more of retransmission requests and feedbacks using buffered data segments;
transmitting, to the source network device, a message notifying the source network device that the threshold number of data segments have been buffered;
receiving, at the target network device from the source network device in response to transmitting, first and second sequence numbers, the first sequence number corresponding to a data segment sent from the source network device to the client device, and the second sequence number corresponding to a data segment received by the source network device from the client device;
associating the first sequence number with the data segment sent from the source network device to the client device;
associating the second sequence number with the data segment received from the client device; and
processing, at the target network device, data segments associated with sequence numbers that succeed the first and the second sequence numbers.

17. The system of claim 16, wherein the operations further comprise:
receiving the data segments having the sequence numbers that succeed the first and the second sequence numbers.

18. The system of claim 16, wherein processing, at the target network device, the data segments comprises applying a first processing technique at a first network layer, and wherein the operations further comprise:
applying a second processing technique to the data segments, the second processing technique being performed at a second network layer, wherein the second network layer is higher than the first network layer.

19. The system of claim 18, wherein the second processing technique comprises performing stateful IP flow processing on the data segments.

20. The system of claim 19, wherein performing stateful IP flow processing comprises decompressing a packet header.

21. The system of claim 16, wherein processing at the target network device comprises using the first and the second sequence numbers associated with the data segments to verify that a complete packet has been received.

22. The system of claim 16, wherein the operations further comprise:
using the first and second sequence numbers to determine where to start processing forward link packets and reverse link packets.

23. The system of claim 16, wherein the data segments that are processed at the target network device are received over a first tunnel, and wherein the operations further comprise:
receiving data segments over a second tunnel, the data segments received over the second tunnel being associated with sequence numbers that precede the first sequence number.

24. The system of claim 23, wherein the data segments received over the second tunnel belong to a packet.

25. The system of claim 23, wherein a decreased amount of data loss occurs during transfer of the communication connection from the source network device to the target network device relative to an amount of data loss expected to occur during transfer of the communication connection.

26. The system of claim 16, wherein data segments buffered are sufficient to reconstruct packets of data transmitted during transfer of a communication connection from the source network device to the target network device.

27. The system of claim 16, further comprising:
transferring control of the communication connection from the source network device to the target network device.

28. The system of claim 27, wherein transferring control of the communication connection is initiated by the source network device.

29. The system of claim 27, wherein transferring control of the communication connection is initiated by the target network device.

30. The system of claim 27, wherein a decreased amount of data loss occurs during transfer of the communication connection from the source network device to the target network device relative to an amount of data loss expected to occur during transfer of the communication connection.

31. A machine-readable storage device configured to store instructions that are executable by one or more processors to perform operations comprising:
buffering a threshold number of data segments at a target network device, the data segments comprising data segments sent from a source network device to a client device and data segments sent from the client device;
handling one or more of retransmission requests and feedbacks using buffered data segments;

transmitting, to the source network device, a message notifying the source network device that the threshold number of data segments have been buffered;

receiving, at the target network device from the source network device in response to transmitting, first and second sequence numbers, the first sequence number corresponding to a data segment sent from the source network device to the client device, and the second sequence number corresponding to a data segment received by the source network device from the client device;

associating the first sequence number with the data segment sent from the source network device to the client device;

associating the second sequence number with the data segment received from the client device; and processing, at the target network device, data segments associated with sequence numbers that succeed the first and the second sequence numbers.

32. The machine-readable storage device of claim 31, wherein the operations further comprise:

receiving the data segments having the sequence numbers that succeed the first and the second sequence numbers.

33. The machine-readable storage device of claim 31, wherein processing, at the target network device, the data segments comprises applying a first processing technique at a first network layer, and wherein the operations further comprise:

applying a second processing technique to the data segments, the second processing technique being performed at a second network layer, wherein the second network layer is higher than the first network layer.

34. The machine-readable storage device of claim 33, wherein the second processing technique comprises performing stateful IP flow processing on the data segments.

35. The machine-readable storage device of claim 34, wherein performing stateful IP flow processing comprises decompressing a packet header.

36. The machine-readable storage device of claim 31, wherein processing at the target network device comprises using the first and the second sequence numbers associated with the data segments to verify that a complete packet has been received.

37. The machine-readable storage device of claim 31, wherein the operations further comprise:

using the first and second sequence numbers to determine where to start processing forward link packets and reverse link packets.

38. The machine-readable storage device of claim 31, wherein the data segments that are processed at the target network device are received over a first tunnel, and wherein the operations further comprise:

receiving data segments over a second tunnel, the data segments received over the second tunnel being associated with sequence numbers that precede the first sequence number.

39. The machine-readable storage device of claim 38, wherein the data segments received over the second tunnel belong to a packet.

40. The machine-readable storage device of claim 38, wherein a decreased amount of data loss occurs during transfer of the communication connection from the source network device to the target network device relative to an amount of data loss expected to occur during transfer of the communication connection.

41. The machine-readable storage device of claim 31, wherein the
data segments buffered are sufficient to reconstruct packets of data transmitted during transfer of a communication connection from the source network device to the target network device.

42. The machine-readable storage device of claim 31, further comprising:

transferring control of the communication connection from the source network device to the target network device.

43. The machine-readable storage device of claim 42, wherein transferring control of the communication connection is initiated by the source network device.

44. The machine-readable storage device of claim 42, wherein transferring control of the communication connection is initiated by the target network device.

45. The machine-readable storage device of claim 42, wherein a decreased amount of data loss occurs during transfer of the communication connection from the source network device to the target network device relative to an amount of data loss expected to occur during transfer of the communication connection.

* * * * *

UNITED STATES PATENT AND TRADEMARK OFFICE
CERTIFICATE OF CORRECTION

PATENT NO. : 8,358,623 B2  
APPLICATION NO. : 11/935975  
DATED : January 22, 2013  
INVENTOR(S) : Prince Samar Page 1 of 1

It is certified that error appears in the above-identified patent and that said Letters Patent is hereby corrected as shown below:

In the Claims:

Column 23, Line 20, In Claim 11, after "wherein" insert -- the --.

Column 24, Line 41, In Claim 26, after "wherein" insert -- the --.

Signed and Sealed this  
Fourteenth Day of May, 2013

Teresa Stanek Rea  
*Acting Director of the United States Patent and Trademark Office*